Feb. 12, 1952     E. O. ROGGENSTEIN ET AL     2,585,685
TABULATING AND TOTAL SENSING CONTROL MECHANISM
Filed May 11, 1949     20 Sheets-Sheet 1

INVENTORS
E. O. ROGGENSTEIN
E. F. THIERFELDER
BY John J. Lynch
ATTORNEY

Feb. 12, 1952    E. O. ROGGENSTEIN ET AL    2,585,685
TABULATING AND TOTAL SENSING CONTROL MECHANISM
Filed May 11, 1949    20 Sheets-Sheet 3

INVENTORS
E.O. ROGGENSTEIN
E.F. THIERFELDER
BY
ATTORNEY

Feb. 12, 1952     E. O. ROGGENSTEIN ET AL     2,585,685
TABULATING AND TOTAL SENSING CONTROL MECHANISM
Filed May 11, 1949     20 Sheets-Sheet 5

INVENTORS
E.O. ROGGENSTEIN
E.F. THIERFELDER
BY
ATTORNEY

Feb. 12, 1952   E. O. ROGGENSTEIN ET AL   2,585,685
TABULATING AND TOTAL SENSING CONTROL MECHANISM
Filed May 11, 1949   20 Sheets-Sheet 6
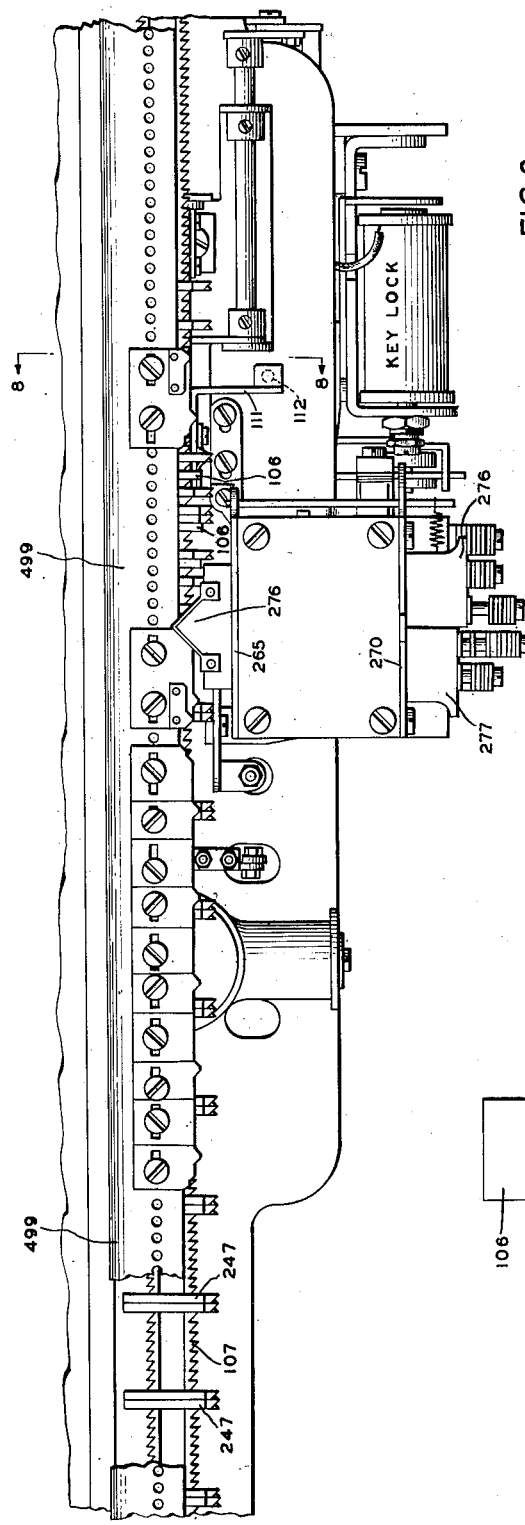
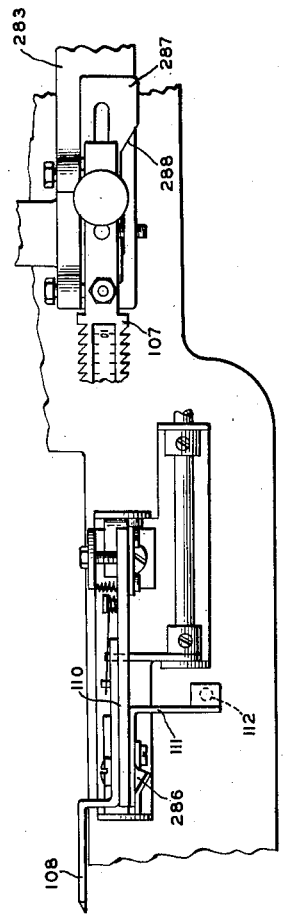
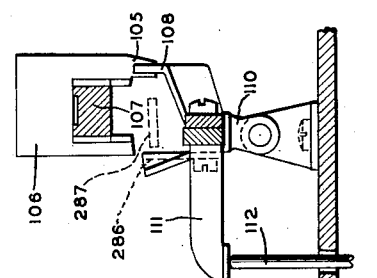
INVENTORS
E. O. ROGGENSTEIN
E. O. THIERFELDER
BY
*John J. Lynch*
ATTORNEY Feb. 12, 1952 E. O. ROGGENSTEIN ET AL 2,585,685
TABULATING AND TOTAL SENSING CONTROL MECHANISM
Filed May 11, 1949 20 Sheets-Sheet 7

INVENTORS
E.O.ROGGENSTEIN
E.F.THIERFELDER
BY
John F. Lynch
ATTORNEY

Feb. 12, 1952 E. O. ROGGENSTEIN ET AL 2,585,685
TABULATING AND TOTAL SENSING CONTROL MECHANISM
Filed May 11, 1949 20 Sheets-Sheet 8

INVENTORS
E.O. ROGGENSTEIN
E.F. THIERFELDER
BY
ATTORNEY

Feb. 12, 1952     E. O. ROGGENSTEIN ET AL     2,585,685
TABULATING AND TOTAL SENSING CONTROL MECHANISM
Filed May 11, 1949     20 Sheets-Sheet 9

INVENTORS
E.O. ROGGENSTEIN
E.F. THIERFELDER
BY
ATTORNEY

Feb. 12, 1952  E. O. ROGGENSTEIN ET AL  2,585,685
TABULATING AND TOTAL SENSING CONTROL MECHANISM
Filed May 11, 1949  20 Sheets-Sheet 10

INVENTORS:
E. O. ROGGENSTEIN
E. F. THIERFELDER
BY
*John J. Lynch*
ATTORNEY

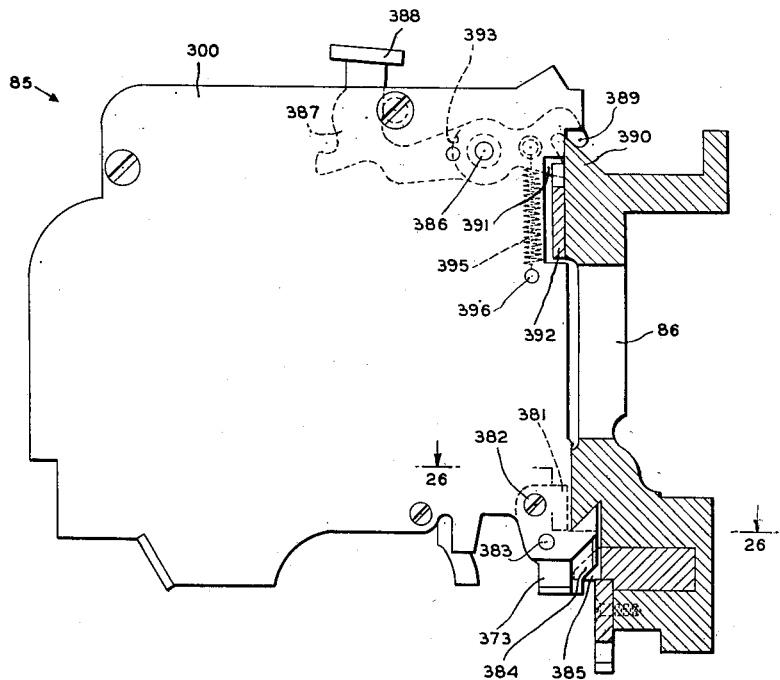
FIG. 20
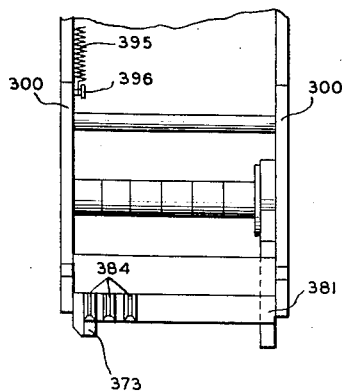
FIG. 25
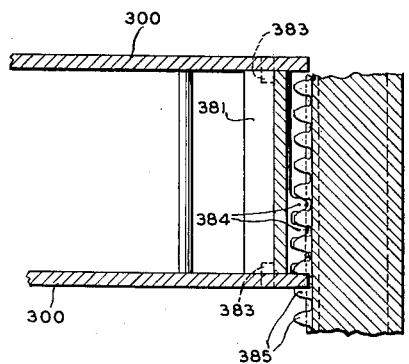
FIG. 26
INVENTORS
E.O. ROGGENSTEIN
E.F. THIERFELDER
BY
ATTORNEY

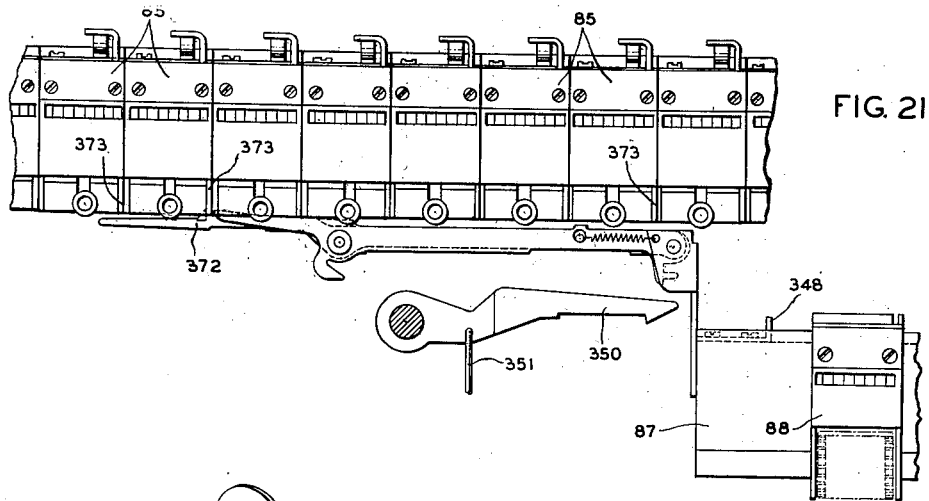
FIG. 21
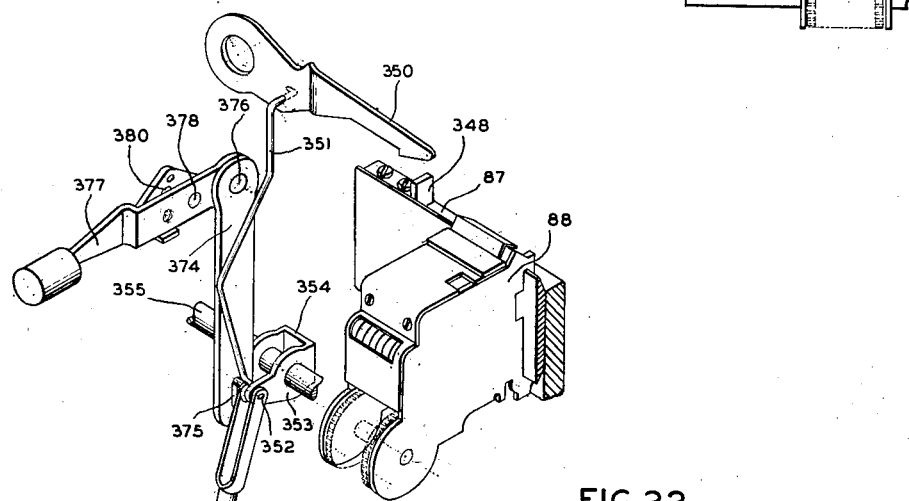
FIG. 22
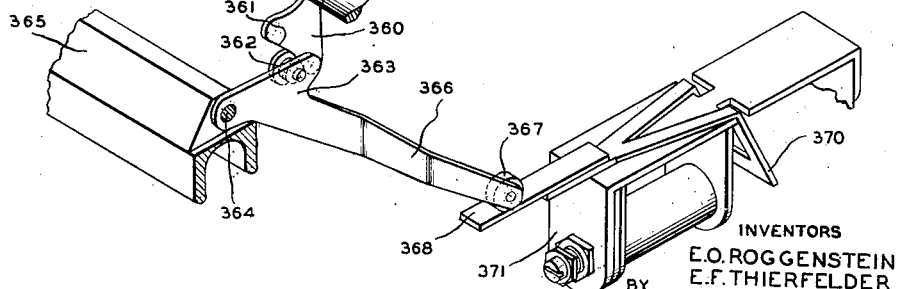
INVENTORS
E.O. ROGGENSTEIN
E.F. THIERFELDER
BY
ATTORNEY Feb. 12, 1952 E. O. ROGGENSTEIN ET AL 2,585,685
TABULATING AND TOTAL SENSING CONTROL MECHANISM
Filed May 11, 1949 20 Sheets-Sheet 13
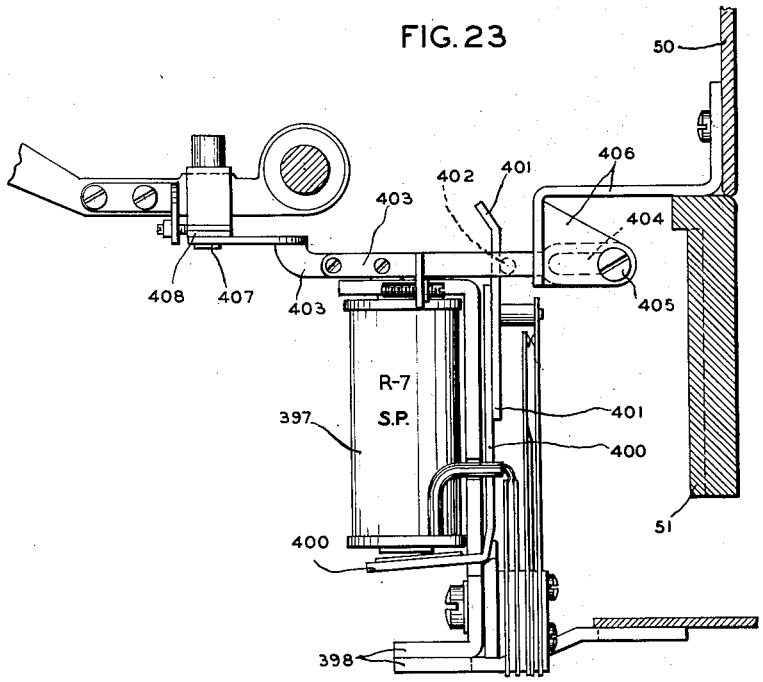
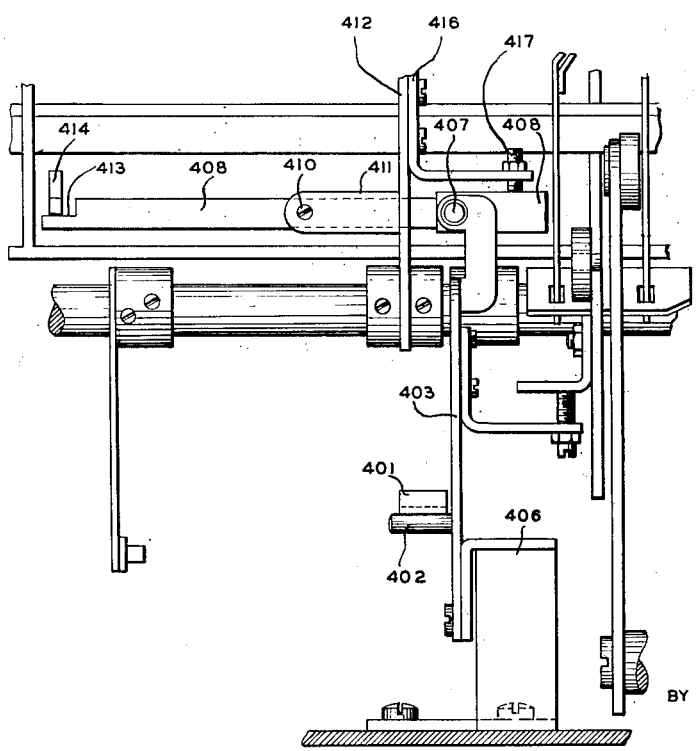
INVENTORS
E.O. ROGGENSTEIN
E.F. THIERFELDER
ATTORNEY Feb. 12, 1952   E. O. ROGGENSTEIN ET AL   2,585,685
TABULATING AND TOTAL SENSING CONTROL MECHANISM
Filed May 11, 1949   20 Sheets-Sheet 14

LEFT SYMBOL ONLY

RIGHT SYMBOL ONLY

LEFT AUTOMATIC BALANCE AND SYMBOL

RIGHT AUTOMATIC BALANCE AND SYMBOL

DIST. LEFT AUTO. BALANCE

DATE

AUTOMATIC TABULATOR TRIP

DECIMAL TABULATOR STOP

COLUMN SELECTOR STOP

INVENTORS
E.O. ROGGENSTEIN
E.F. THIERFELDER
BY John J. Lynch
ATTORNEY

Feb. 12, 1952   E. O. ROGGENSTEIN ET AL   2,585,685
TABULATING AND TOTAL SENSING CONTROL MECHANISM
Filed May 11, 1949   20 Sheets-Sheet 16

FIG.38

*INVENTORS*
E.O. ROGGENSTEIN
E.F. THIERFELDER
BY
John J. Lepich
ATTORNEY

Feb. 12, 1952    E. O. ROGGENSTEIN ET AL    2,585,685
TABULATING AND TOTAL SENSING CONTROL MECHANISM
Filed May 11, 1949      20 Sheets-Sheet 18
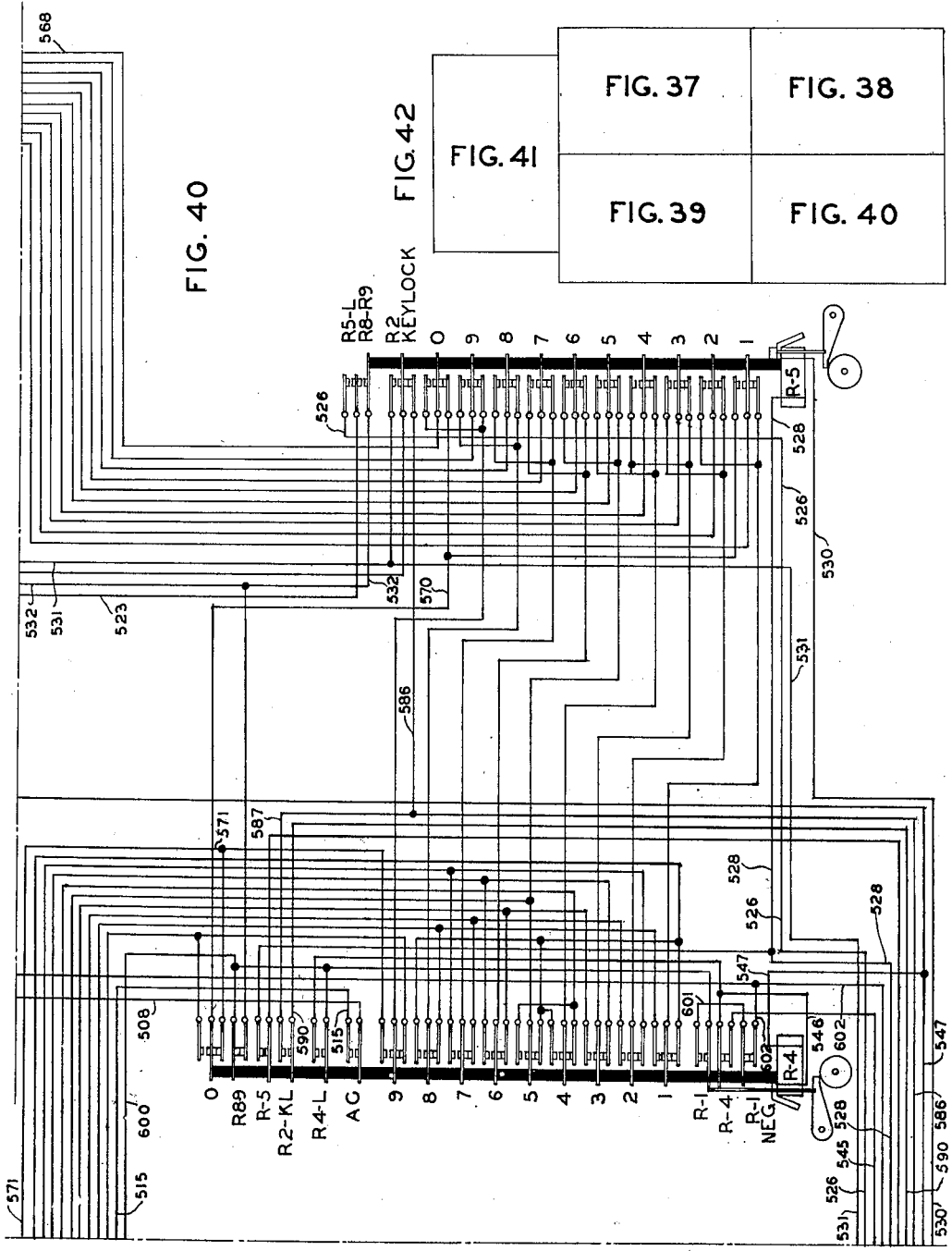
INVENTORS
E.O. ROGGENSTEIN
E.F. THIERFELDER
BY
*John J. Lynch*
ATTORNEY

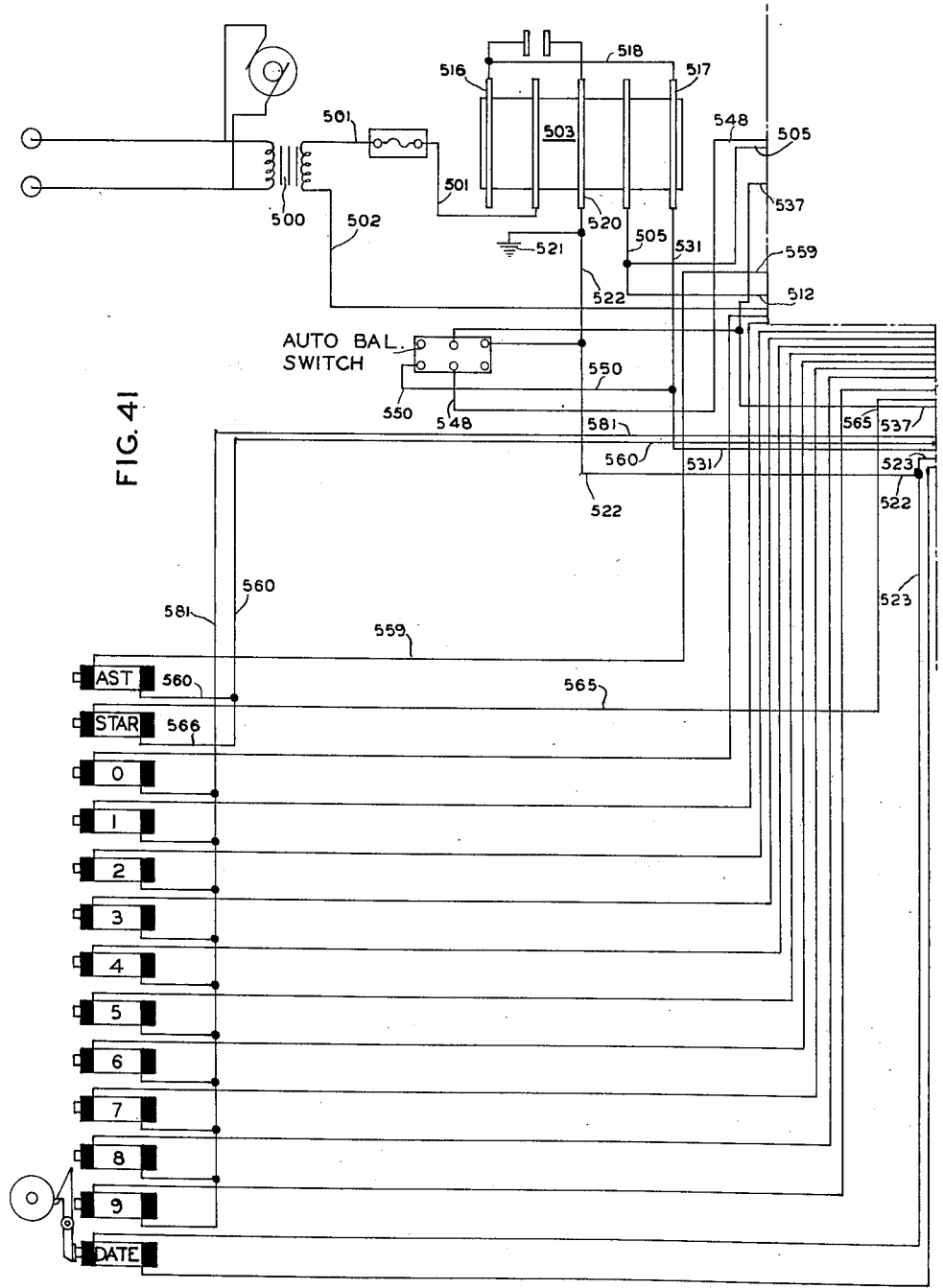

Feb. 12, 1952     E. O. ROGGENSTEIN ET AL     2,585,685
TABULATING AND TOTAL SENSING CONTROL MECHANISM
Filed May 11, 1949                       20 Sheets-Sheet 20
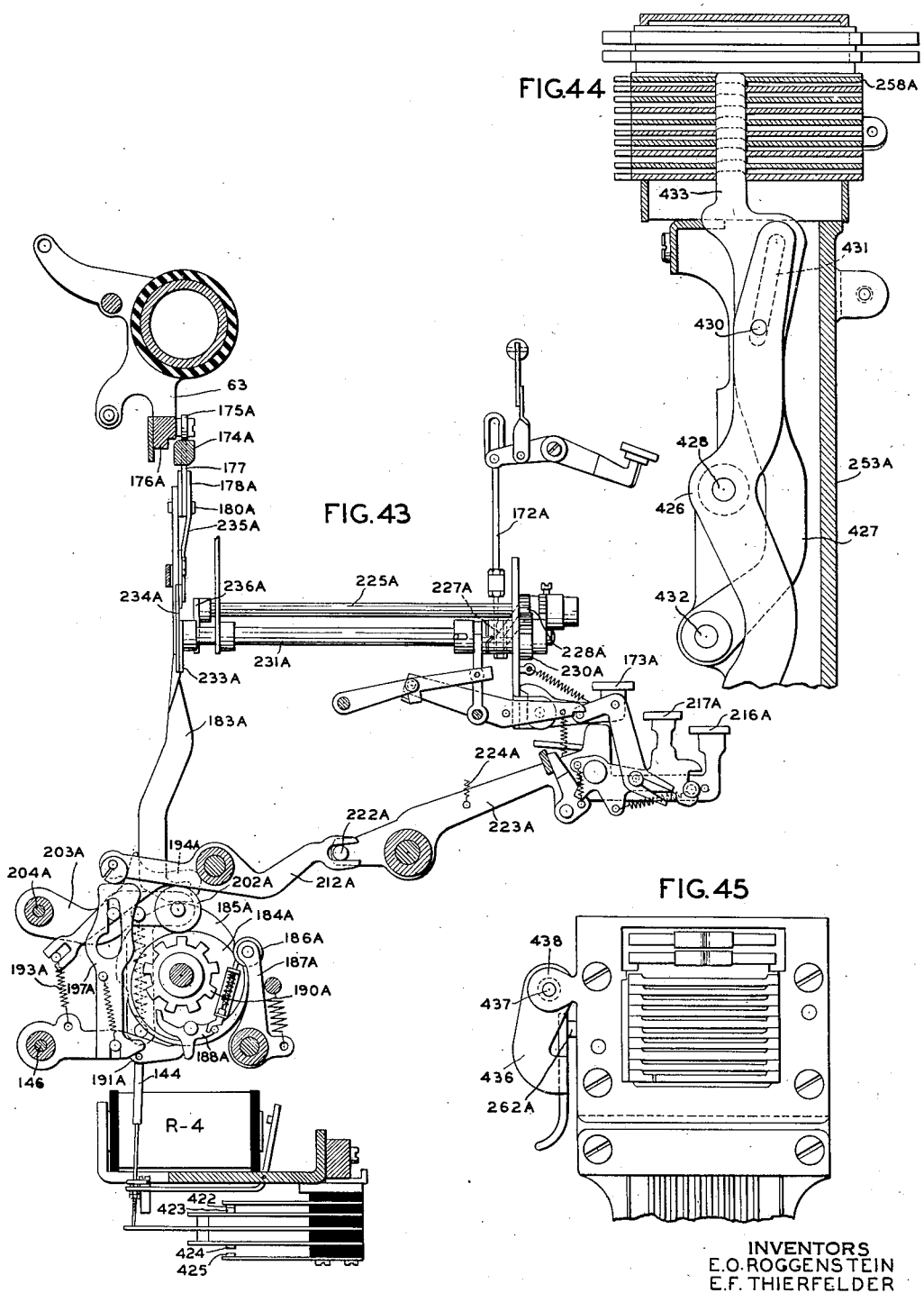
INVENTORS
E. O. ROGGENSTEIN
E. F. THIERFELDER
BY
ATTORNEY Patented Feb. 12, 1952

2,585,685

UNITED STATES PATENT OFFICE 2,585,685

TABULATING AND TOTAL SENSING CONTROL MECHANISM

Edwin Otto Roggenstein, Norwalk, Conn., and Emil F. Thierfelder, Ilion, N. Y., assignors to Remington Rand Inc., New York, N. Y., a corporation of Delaware Application May 11, 1949, Serial No. 92,706

14 Claims. (Cl. 235—59)

This invention relates to new and useful improvements in recording and computing machines and is particularly presented as containing improvements on the machine disclosed in U. S. Patent No. 2,364,759, issued December 12, 1944 and entitled "Recording and Computing Machines."

The present invention is designed to meet the requirements of modern business and in view of this, many previous features which were advancements in the bookkeeping machine art at the time, are now considered too slow, or present various inconveniences in operation. These features include tabulating set-ups as well as various tabulating operations, carriage spacing, various printing operations, etc.

Therefore, it is the principal object of this invention to simplify and improve the tabulating mechanism and all related features to thereby enable a more reliable and rapid operation thereof.

Another object of the invention is to combine the functions of the decimal and column selection mechanisms so as to enable either the selection of a decimal or columnar position of the carriage upon operation of any one of the tabulating keys.

Still another object of the invention is to enable the set-ups required for automatic tabulating to be quickly and easily changed.

Another object of the invention is to improve the pickup means for the cross registers whereby they may be picked up repeatedly with a minimum of strain on the parts involved, thereby avoiding the possibility of distortion with consequent printing in the wrong position.

Another object of this invention is to retain the cross totalizer in its "locked out" position during tabulation through one or more columns.

Another object of the invention is to improve the vertical registers so as to enable them to be "picked off" the vertical truck, thereby eliminating the necessity of lateral movement along the truck as well as the removal of all adjacent totalizers.

Another object is to normally enable printing through automatic balance or date columns and to enable automatic printing of the balance or date only when the carriage has been tabulated into those columns.

Another object of this invention is to permit banking of registers in automatic balance columns and to automatically lock out automatic printing upon completion of an automatic balance operation.

Another object of the invention is to increase the speed of the speed of the carriage during spacing operations.

Another object of the invention is to increase the speed of printing during automatic operations.

Other objects and structural details will be apparent from the following description when read in connection with the accompanying drawings wherein.

Figure 3:
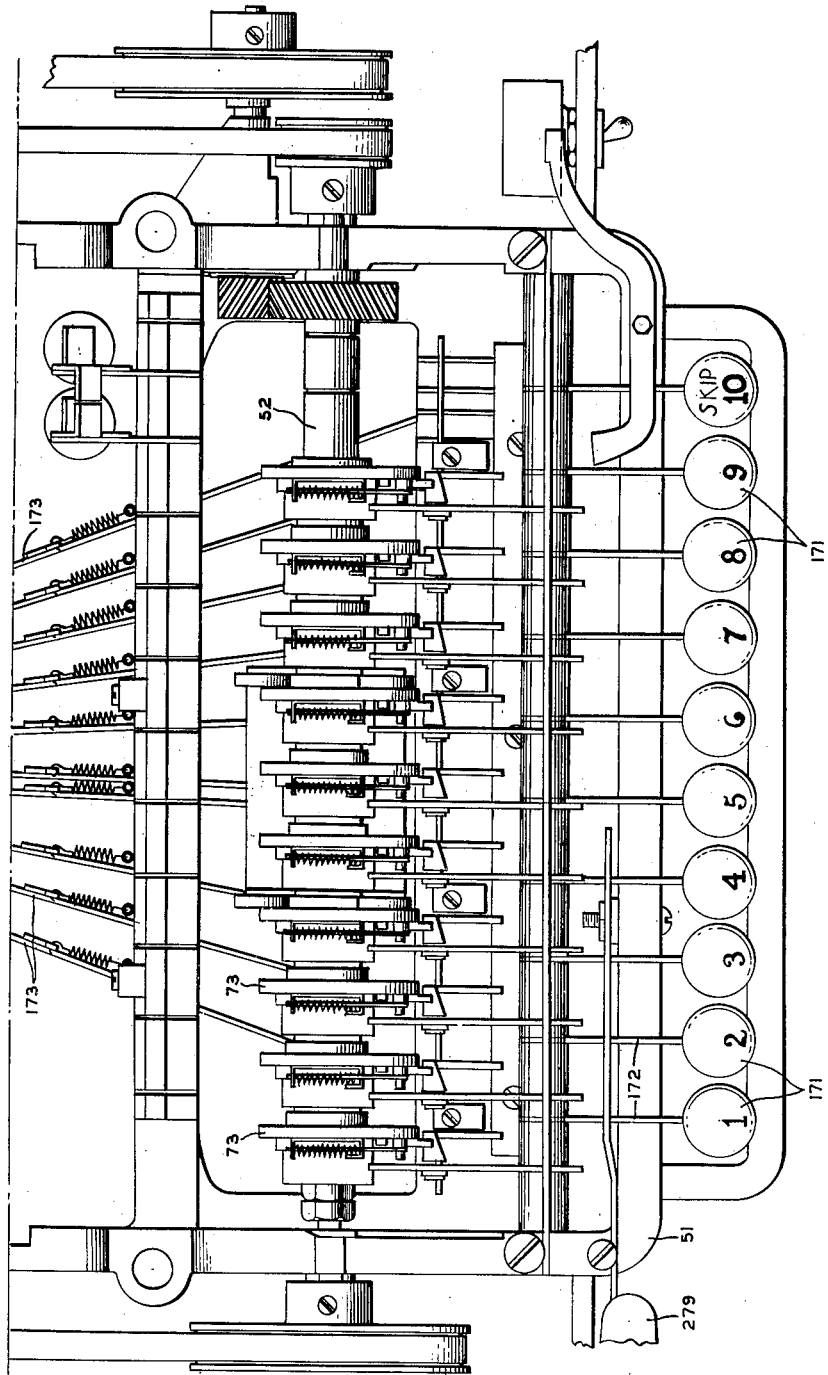
Figure 4:
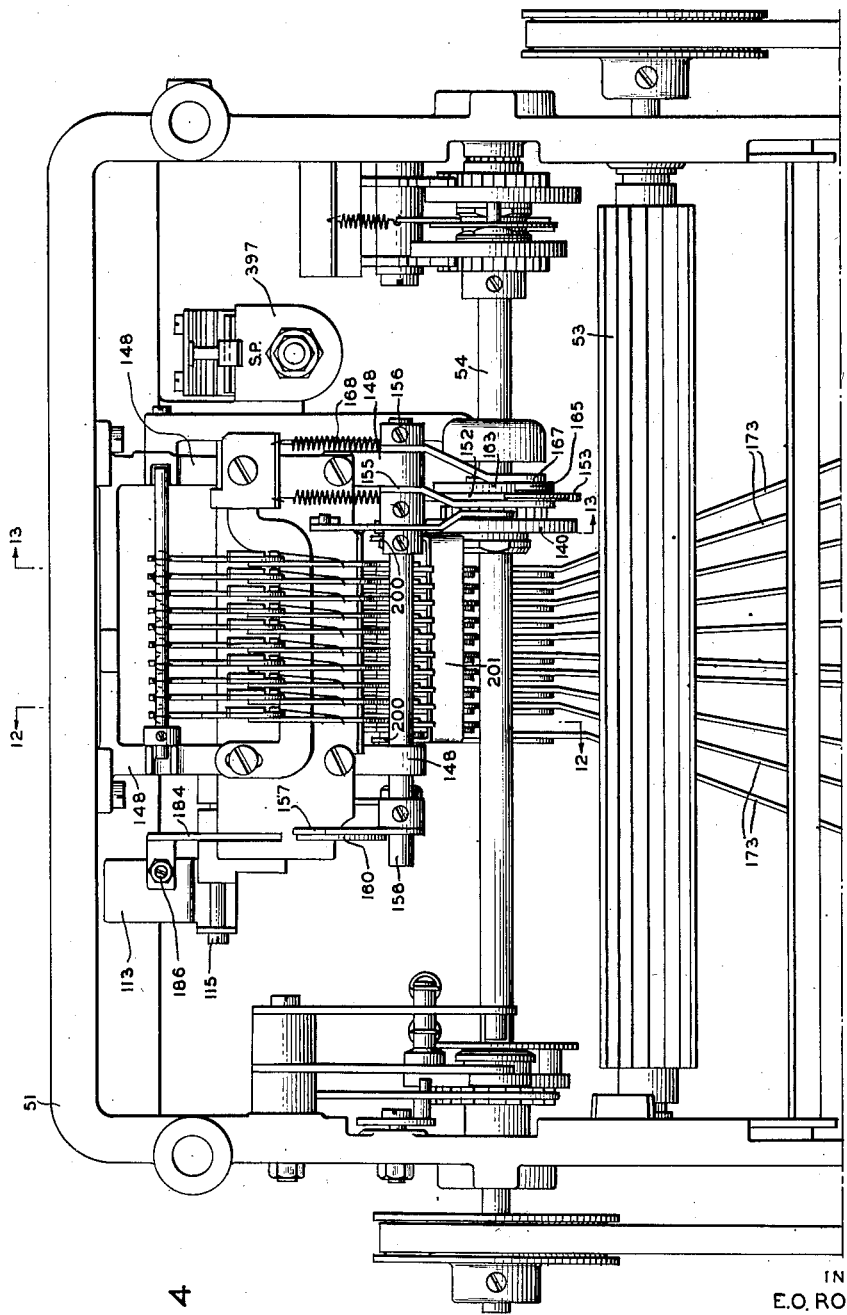
Figure 5:
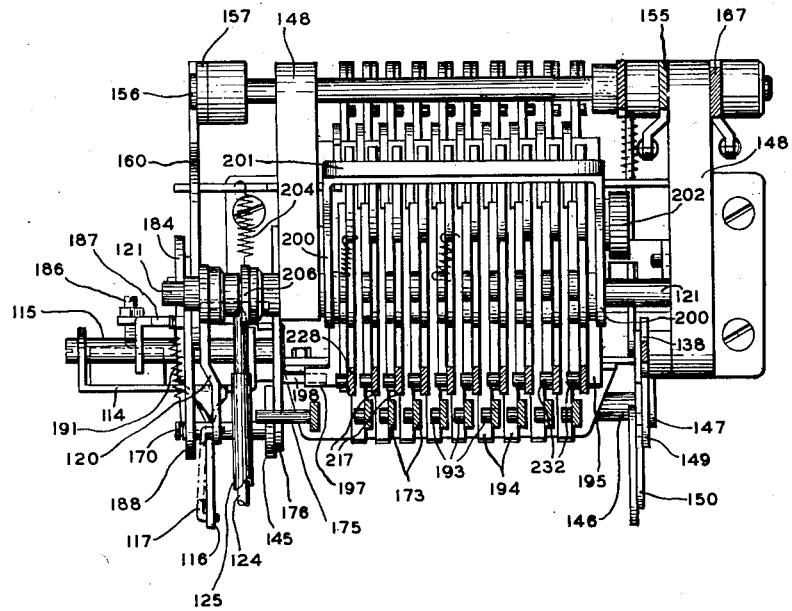
Figure 6:
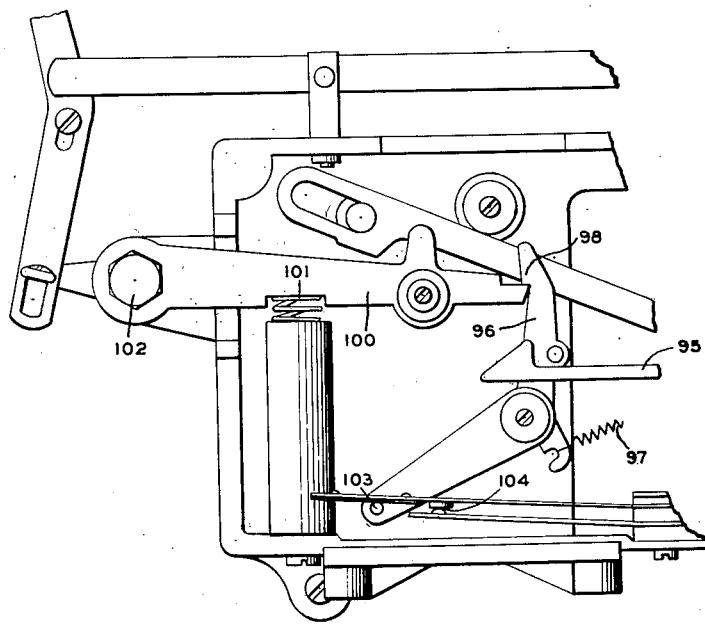
Figure 10:
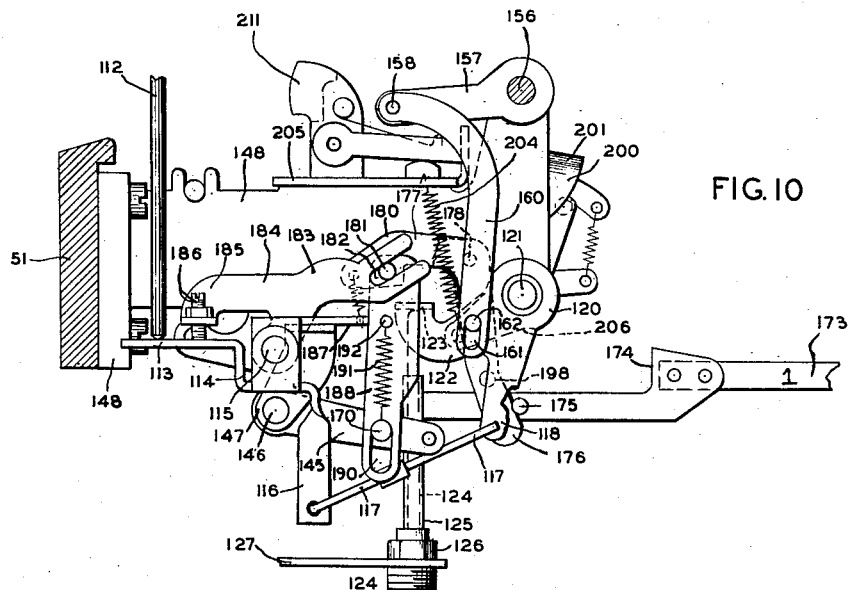
Figure 11:
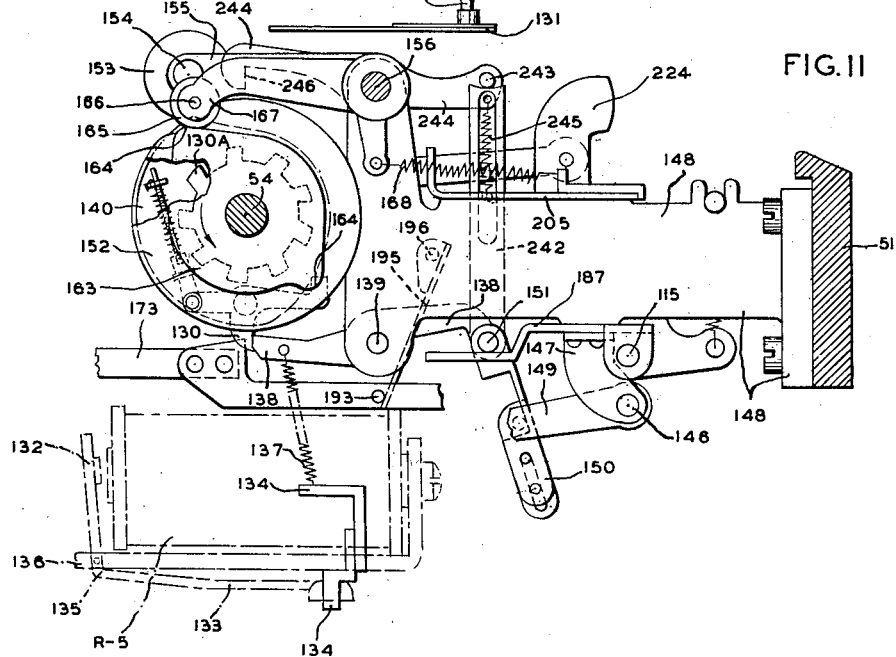
Figure 12:
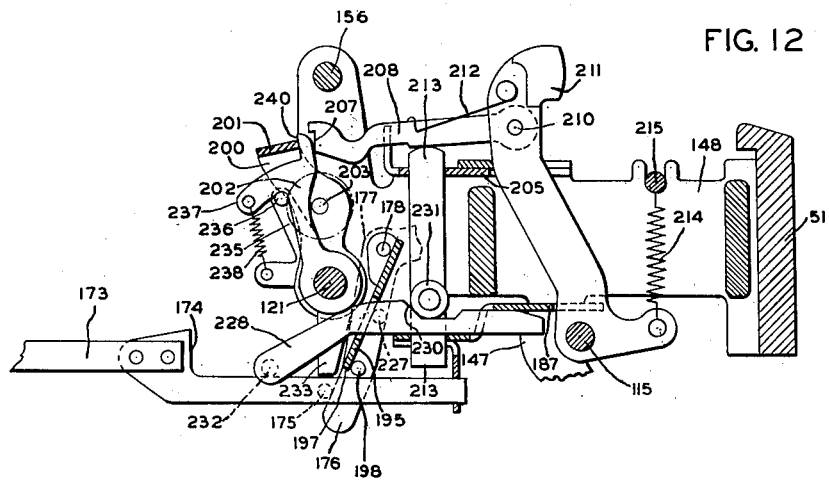
Figure 13:
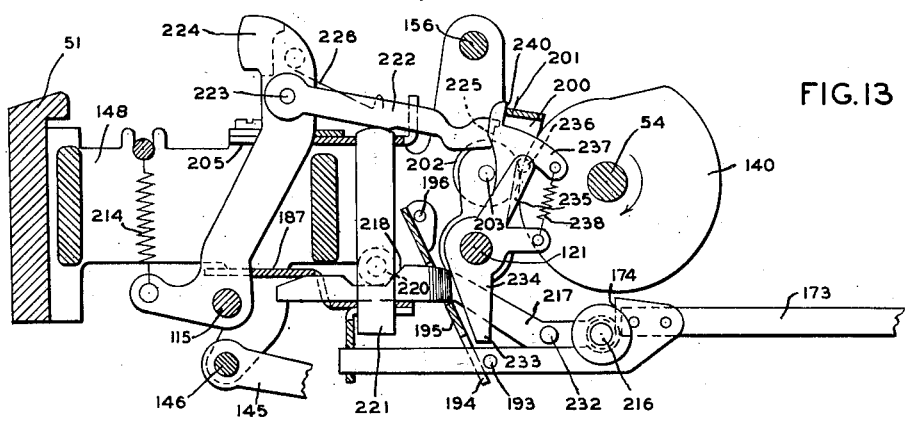
Figure 14:
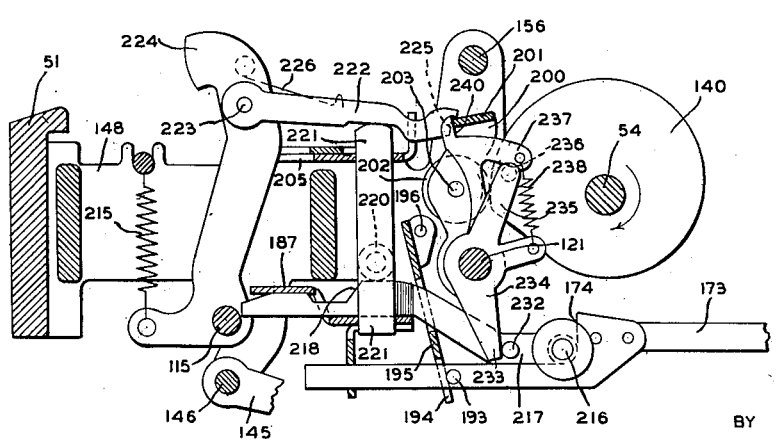
Figure 15:
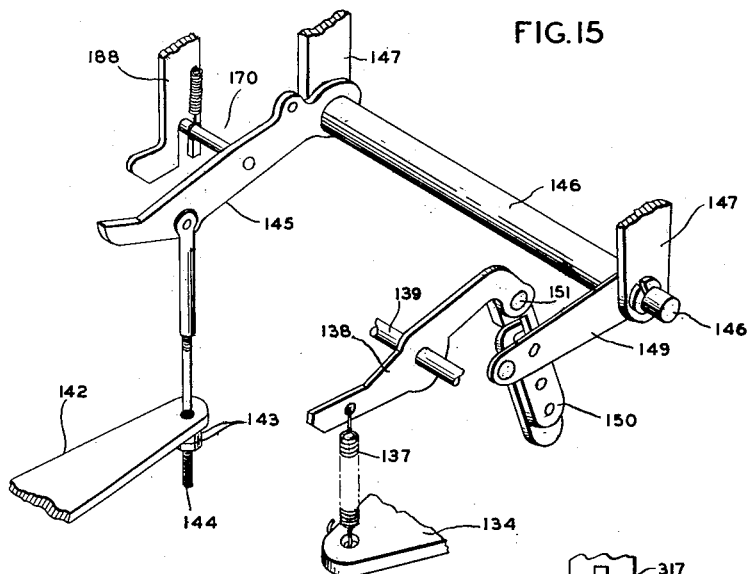
Figure 27:
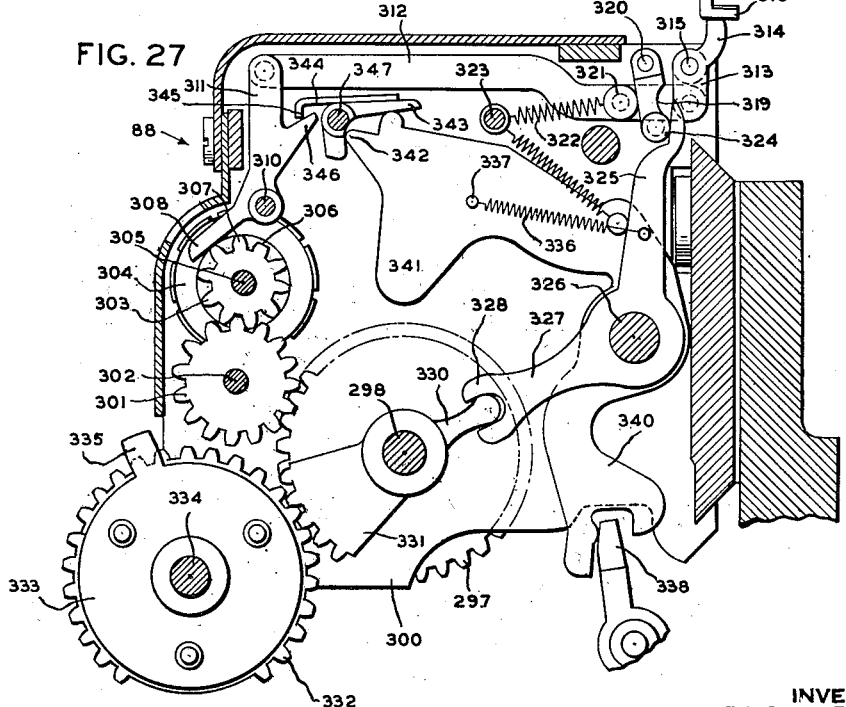
Figure 16:
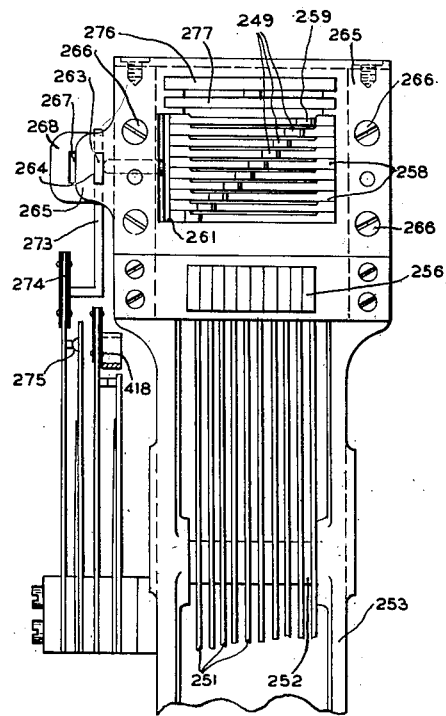
Figure 17:
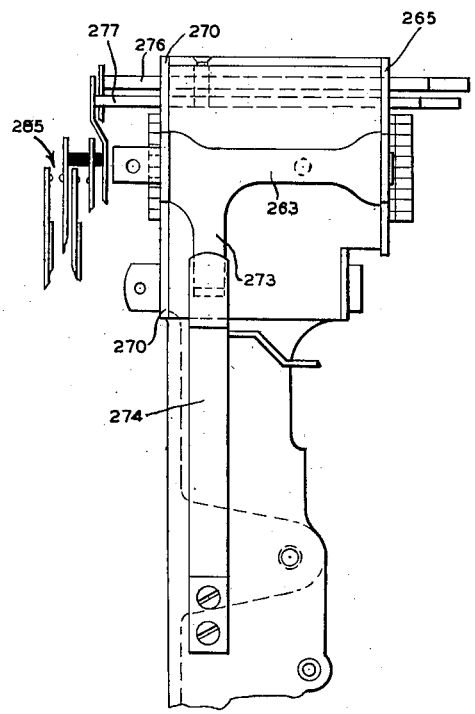
Figure 18:
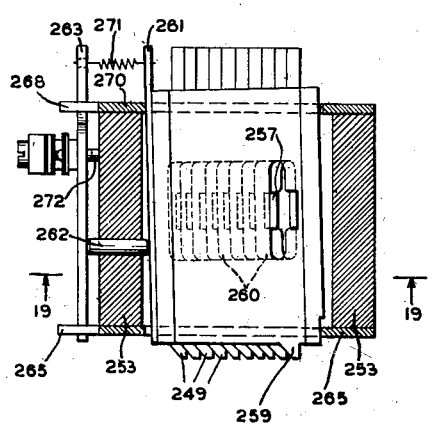
Figure 19:
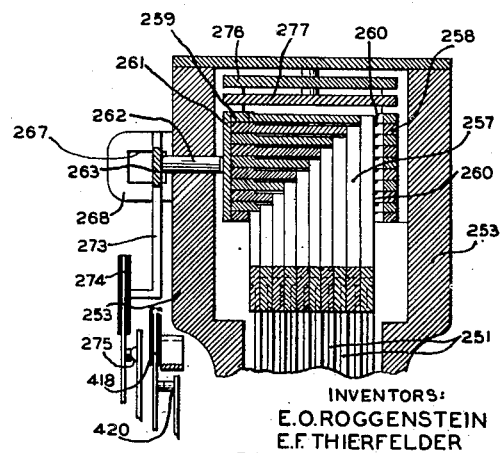
Figure 34:
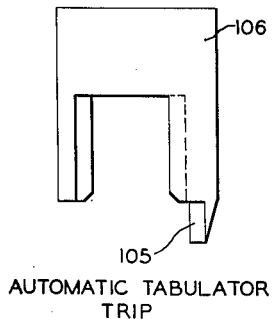
Figure 35:
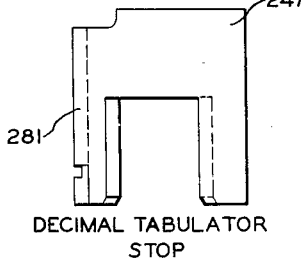
Figure 36:
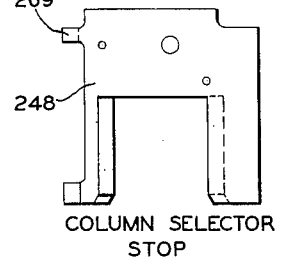

Figs. 3 and 4 taken together represent a substantially complete top plan view of the front and rear sections of the power base as seen when the typewriter frame is raised therefrom;

Fig. 5 is a front elevational view of the tabulator unit;

Fig. 6 is a side elevational view of a portion of the carriage return mechanism showing the carriage return switch;

Fig. 7 is a top plan view of a portion of the tabulator rack bar;

Fig. 8 is a cross sectional view taken along the line 8—8 of Fig. 7 showing part of the automatic tabulator mechanism;

Fig. 9 is a partial top plan view of the automatic tabulator mechanism shown in Figs. 7 and 8;

Fig. 10 is a left hand side elevational view of the tabulator unit including the tabulator flick switch;

Fig. 11 is a right hand side elevational view of the tabulator unit with the parts in normal position;

Fig. 12 is a cross sectional view of the tabulator unit taken along the line 12—12 of Fig. 4;

Fig. 13 is a cross sectional view of the tabulator unit taken along the line 13—13 of Fig. 4;

Fig. 14 is a cross sectional view similar to Fig. 13 but with the parts in the operated position;

Fig. 15 is a perspective view of the tabulator cam latch and its associated locking mechanism;

Fig. 16 is a front elevational view of the tabulator head including the tabulator break switch, escapement switch and stop slides;

Fig. 17 is a left hand side view of Fig. 16 showing control slide plates for operating certain switches;

Fig. 18 is a top plan view of Fig. 16 with the cover, the control slide plates and tabulator stop plates removed;

Fig. 19 is a vertical cross sectional view taken along the line 19—19 of Fig. 18 and showing the relationship between the stop slides and the stop plates;

Fig. 20 is a right hand side view of a vertical totalizer disclosing the improved pick-up mechanism;

Fig. 21 is a partial front elevational view showing the relationship between the truck-lock hook and the vertical and cross totalizers;

Fig. 22 is a perspective view showing the cross truck and its associated locking mechanism;

Fig. 23 is a side elevational view showing the spacing relay and its associated mechanism;

Fig. 24 is an inverted plan view of the high speed spacing mechanism under control of the spacing relay;

Fig. 25 is a partial rear elevational view of a vertical totalizer showing an improved form of pick-up bar;

Fig. 26 is a cross sectional plan view taken along the line 26—26 of Fig. 20 showing the manner in which the pick-up bar engages the truck;

Fig. 27 is a right hand side view of a cross totalizer with the cover broken away to show the improved clear signal operating mechanism;

Figs. 28 to 33 inclusive are top plan views of some of the control cams employed for operating certain control switches;

Fig. 34 is a side view of the tabulator trip;

Fig. 35 is a side view of the decimal tabulator stop;

Fig. 36 is a side view of the column selector stop;

Figs. 37, 38, 39, 40 and 41 when placed together represent the complete circuit diagram of the machine; and Fig. 42 is a diagram of the relative circuit layout of Figs. 37, 38, 39, 40 and 41.

Fig. 43 is a vertical section through a portion of the machine showing the carriage shift mechanism.

Fig. 44 is a vertical cross sectional view similar to Fig. 19 through a modification of the tabulator column.

Fig. 45 is a front elevational view of a part of a modification of the tabulator head shown in Fig. 16.

*Power operated general typewriter mechanism*

In the drawings, the invention is shown as applied to an electrified Remington bookkeeping machine. This machine is well known in the art and has been described in a series of patents, and only so much of it is shown in the present drawings as is necessary to an understanding of the present invention and its application thereto.

Figure 1:
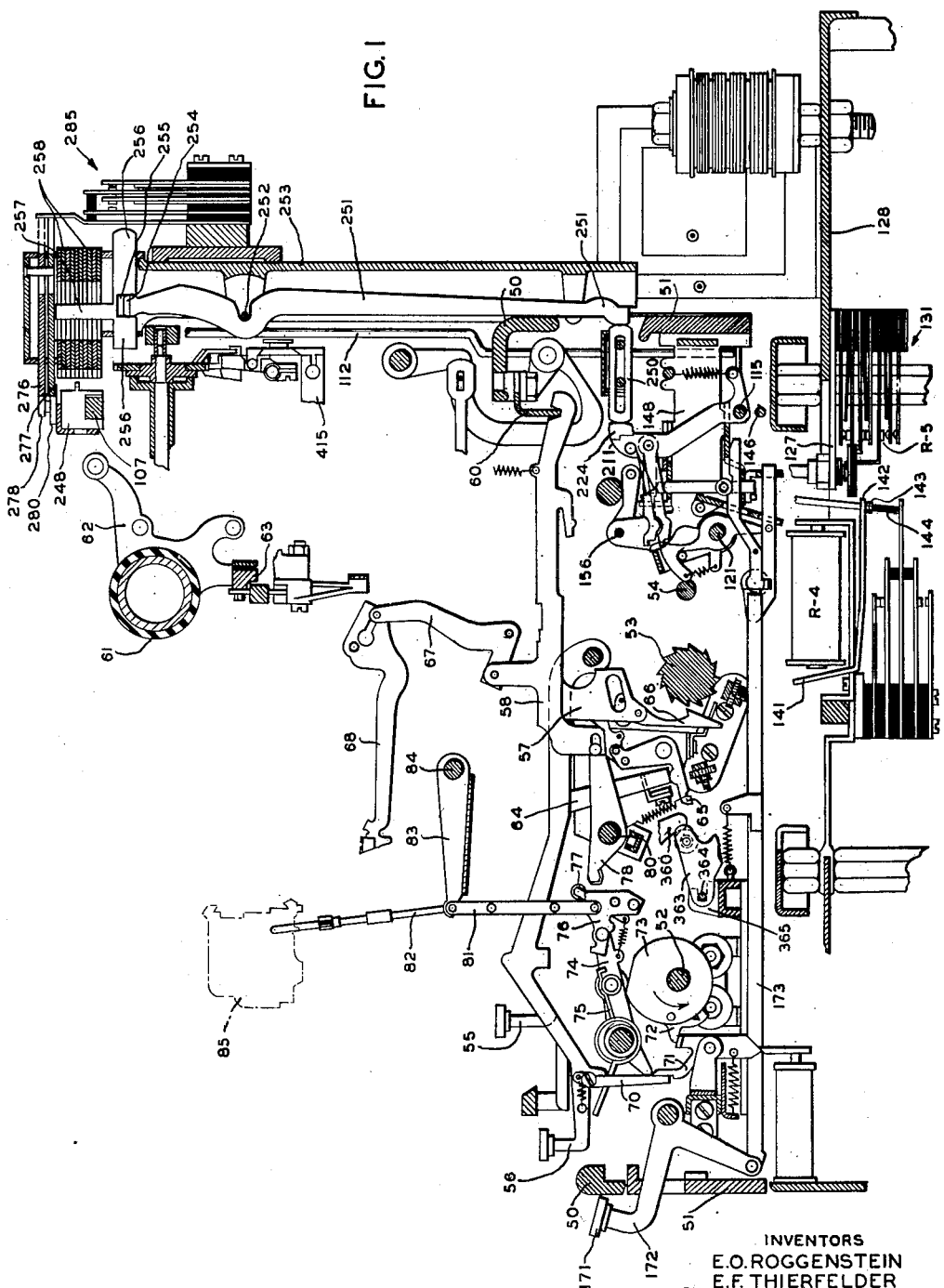
Fig. 1 is a general front to rear vertical sectional view of the machine, embodying the present invention, taken on an irregular section line with some parts broken away and many parts omitted.

Referring to Fig. 1 of the drawings, the above mentioned Remington machine includes a typewriter of which fragments of the frame 50 are shown. This frame is hingedly mounted upon a power base frame 51 Figs. 3 and 4 wherein are contained three continuously rotating power shafts which are driven counter-clockwise by a motor (not shown). The first is a front shaft 52 for operating the computing mechanism and the numerical type bars, the second is a snatch roll 53 for operating the alphabetical and other character type bars, and the third is a rear power shaft 54 for driving various cams which, when released, effect such operations as tabulation, case shifting, key lock, timing, back-spacing, and date printing. Alphabetical key levers 55, numerical key levers 56, and their corresponding operating levers 57 and 58 respectively are all pivoted on an angle bar 60 at the rear of the machine. The operating levers 57 and 58 are employed for actuating the type bars to strike against a platen 61 to effect printing. The platen 61 is carried by a frame 62 which is supported by a carriage 63.

Upon the depression of an alphabetical key lever 55, a depending arm 64 on the said lever rotates a bell-crank 65 which results in the engaging of a pawl 66 with the rotating snatch roll 53. The pawl 66 is pivotally connected to an alphabetical operating lever 57 which, when pulled down rotates a bell-crank 67 for operating a type bar 68.

Upon the depression of a numerical key lever 56 a depending lever 70 thereon rotates a cam latch 71 in counter-clockwise direction thereby releasing a clutch dog 72 which is pivotally mounted upon an associated cam 73. The clutch dog 72, when thus released, engages the usual clutch wheel fixed to the continuously rotating shaft 52 thereby rotating the cam 73 one revolution when it is again stopped by the dog 72 being arrested by the cam latch 71 which has at this time returned to its normal position. During its rotation the cam 73 controls a follower lever 74 which is urged in clockwise direction by a spring 75. The periphery of the cam is formed to enable first the lowering of the lever 74 and then the raising of it. Upon the lowering of the said lever 74 a pawl member 76 pivoted thereto is also lowered. The pawl member 76 has a roller 77 which is adapted to snap past the front end of a lever 78 pivotally mounted upon a shaft 80. The lever 78 is connected at its other end to the numerical type bar operating lever 58. On the upstroke of the lever 74, the roller 77 of the pawl member 76 strikes against the lower edge of the lever 78 thereby rotating the said lever in the clockwise direction to pull down the numerical type bar operating lever 58 to actuate its corresponding bell-crank 67 and type bar 68.

*Computing mechanism*

The computing mechanism involved herein is of the sort that has long been used in the Remington machines and which is described in a line of patents, which in a way may be said to begin with that to Wahl 1,270,471 dated June 25, 1918.

Referring to Fig. 1, the computing operation is performed by means of a link 81 which at its lower end is connected to the pawl member 76 and at its upper end to a pull-rod 82 both being pivotally connected to an arm 83 pivoted on a shaft 84. When the pawl member 76 is lowered by the lever 74 it pulls down the link 81 and the pull-rod 82 to actuate the computing mechanism.

Figure 2:
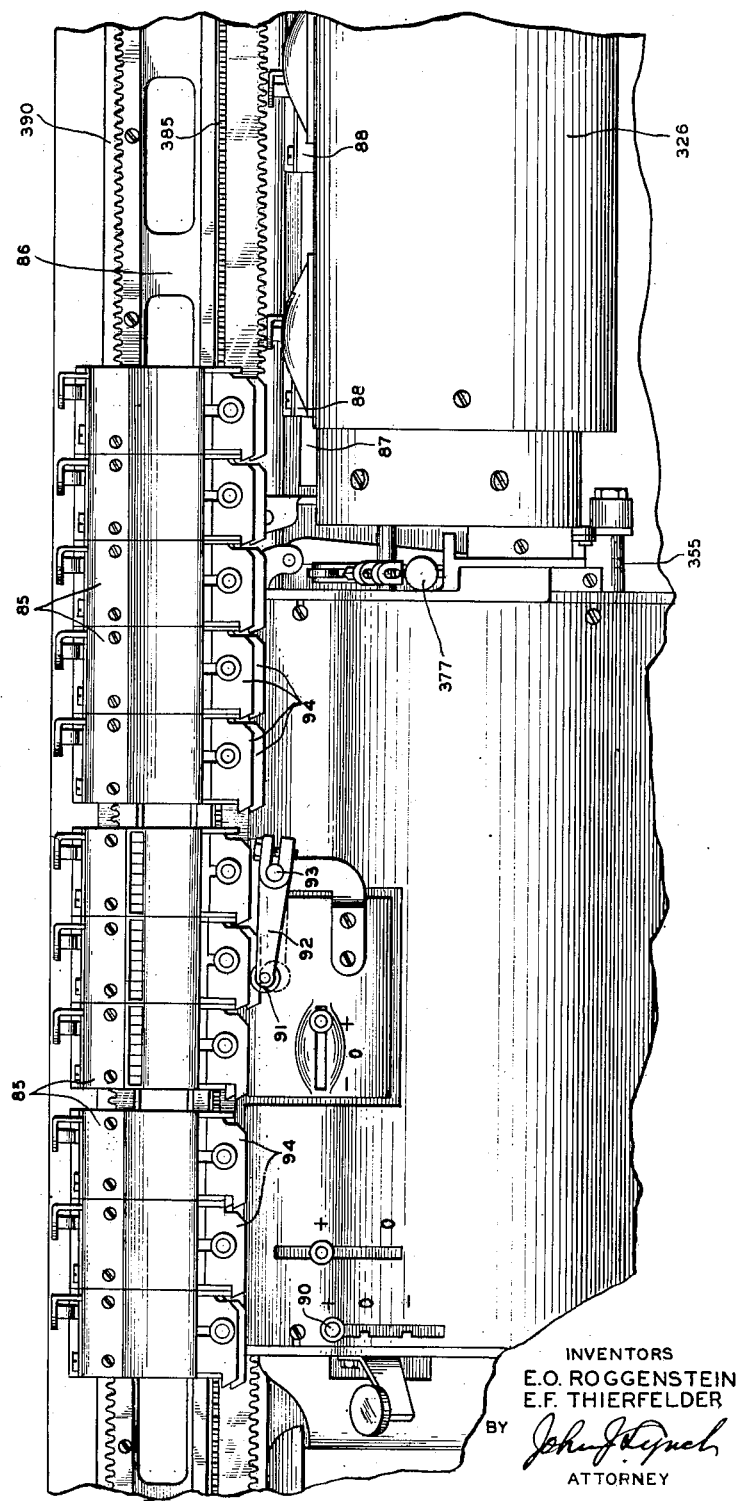
Fig. 2 is a partial front elevation of the machine, showing mainly the vertical registers, the vertical truck and the sensing unit.

Referring to Fig. 2, the differential and control mechanism of this computer is mounted upon a casing which is secured to the front face of the typewriter. Vertical totalizers, or "dummies," 85 may be mounted at desired points on a main truck 86 and connected to the carriage in the manner shown in the above mentioned Patent 2,364,759. The machine also includes cross footing mechanism mounted upon a cross truck 87 which carries one or more cross totalizers 88. The cross totalizers 88 are controlled by the vertical totalizer 85, one after another, through the intermediary of the usual pick-up beam. At the end of each columnar computation, the cross totalizer 88 is released from the vertical totalizer 85 and is drawn back to its original right hand position under tension of a spring (not shown).

Totalizers and actuator mechanism

The vertical totalizers 85 are actuated by the usual mechanism through the operation of the pull-rods 82 (Fig. 1). The effect of this mechanism is to add or subtract items in the vertical totalizers 85 which items in turn are transmitted to the cross totalizers 88. The vertical totalizer actuator may be reversed for subtraction by means of the usual manual reversing lever 90 (Fig. 2). The cross totalizer actuator may be reversed for subtraction by the usual means including a follower roller 91 (Fig. 2) mounted on an arm 92 fast on a rock shaft 93 connected to the reversing mechanism. The follower roller 91 is movable under control of cams 94 on each of the vertical totalizers 85. Each cam is settable either to an upper "add" position where it does not depress the roller 91, to an intermediate "disconnect" position where the cross totalizer actuator is rendered inoperative, or to a lower "subtract" position where the roller 91 is depressed to its fullest extent.

Power operated shift and reverse mechanism

As is described in the above mentioned Patent 2,364,759, the actuating mechanism may also be reversed by the usual power operated case shift mechanism thereby enabling the totalizers to be operated in the reverse direction. The case shift mechanism is operable upon depression of the usual credit balance and shift keys for raising the carriage to print negative totals in distinctive type.

Carriage return mechanism

The present machine includes the usual power driven carriage return mechanism which at the end of a line of writing is capable of returning the carriage to the beginning of a new line. Referring to Fig. 6, a latch-link 95 which is actuated through the means of a usual marginal stop (not shown), is adapted to rock a bell-crank lever 96 which is tensioned in the counter-clockwise direction by a spring 97. The lever 96 has a latch 98 for restraining an arm 100 from counter-clockwise rotation against the tension of a spring 101. The arm 100 is securely mounted upon a rock shaft 102 which, when rotated, effects the engagement of certain power mechanism with the carriage to return it to a starting position. The lower end of bell-crank lever 96, is provided with a stud 103 which, when the lever 96 is rotated clockwise, opens a pair of contacts 104 (see also Fig. 38). This contact is in the power circuit of all the magnets and relays of the machine, therefore their operation is prevented during the return of the carriage.

All of the above mechanisms described under the various chapter headings are part of the Remington bookkeeping machine art and need not be further described herein.

Flick switch control for tabulation

The above mentioned Patent 2,364,759 discloses an automatic tabulator utilizing cam blocks of uniform length to flick the mechanical linkage for operating a switch. This switch in turn energizes a tabulator magnet to release the tabulator cam. As soon as the tabulator cam is released the tabulator holding switch is closed to control certain circuits including a holding circuit for the tabulator magnet. The above cam blocks are preset underneath the usual tabulator rack bar in accordance with the various tabulating positions desired. Therefore, in order to reset these cam blocks for other tabulating operations it has been necessary to remove the entire rack bar from the machine.

In the present machine the tabulator settings can be made on the rack bar without the necessity of removing the bar from the machine. Referring to Fig. 8, a lug 105 depends from an automatic tabulator trip 106 (see also Fig. 34) which is placed on a rack 107 secured to the carriage 63. The lug 105 is adapted to rock an arm 108 (see also Fig. 9) which forms part of a rock frame 110. The other arm 111 of the rock frame 110 rests upon a rod 112 which extends downward from the frame 50 and into the base frame 51. The rod 112 is similar to the rod 222 shown in Fig. 29 of the above mentioned Patent No. 2,364,759. Referring particularly to Fig. 10, the lower end of the rod 112 rests upon a plate 113 which forms parts of a rocking frame 114 which frame is rotatably mounted on a cross shaft 115. The rocking frame 114 also has a depending arm 116 which is connected by a rod 117 to an arm 118 of a bell-crank lever 120. The lever 120 is rotatably mounted upon a cross shaft 121 and has another arm 122 which has its end formed into a flat plate 123. The plate 123 rests upon the upper end of a rod 124 which is housed in a sleeve 125 securely mounted by means of a nut 126 to a bracket 127 fixed to a relay plate 128 suitably secured to the base frame 51 (Fig. 1). The lower end of the rod 124 is adapted, when depressed, to actuate a flick switch generally designated as 131 (see also Fig. 37).

The above construction is such that when the carriage is moved to a position wherein the lug 105 engages the arm 108 laterally, the rock frame 110 is rocked counter-clockwise (Fig. 8) whereby the arm 111 engages and lowers the rod 112. When the rod 112 is thus lowered it rocks the rocking frame 114 counter-clockwise (Fig. 10) which, through rod 117, rocks the bell-crank lever 120 in a counter-clockwise direction. The rocking movement of the lever 120 causes depression of the rod 124 within its sleeve 125 to thereby operate the flick switch 131.

As will be later brought out in more detail, one of the contacts of the flick switch closes a circuit for the magnet of a relay R–5 the functions of which are fully disclosed in the above Patent 2,364,759 except as will be hereinafter set forth. Referring to Fig. 11, the armature 132 of the relay R–5 is provided with an extension 133 having a bracket 134 secured thereto. The armature 132 is pivoted at 135 in the relay bracket 136 and is urged in a counter-clockwise direction by means of a spring 137 one end of which is connected to the bracket 134 and the other end connected to a cam trip latch 138. The trip latch 138 is loosely pivoted upon the stud shaft 139 suitably secured to a frame casting 140. When the magnet of relay R–5 is energized as a result of the closing of the flick switch, as has been described, the armature 132 is moved clockwise and through pull on the spring 137, causes disengagement of the cam trip latch 138 to allow a dog 136, under urge of its spring, to engage a clutch wheel 139A fixed to the shaft 54. Because of spring connection 137 it will be seen that the movement of the armature 132 will disengage the latch 138. If this latch is for some reason held in dog engaging position the spring 137 will stretch to permit the movement of the armature independently of the latch 138. The reason for this will be considered in detail later. The cam latch 138 is of the type shown in Fig. 10 of the Patent 2,364,759 and when it disengages the dog 130, which is pivoted to the cam 140, the dog completes a driving connection between the continuously rotating shaft 54 and the tabulating cam 140 whereby the tabulating operations are performed.

Since the relay R–5 magnet is a ten's complement magnet, it is obvious that when it becomes necessary for it to operate to enable the printing of ten's complements, it must not then act as a tabulator magnet as described above. Therefore, means have been provided so that, when so acting, its functions as a tabulator magnet are temporarily interrupted to effect this result. It is to be noted that whenever the relay R–5 magnet operates as a ten's-complement magnet, a relay R–4 magnet (Fig. 40), which is a nine's-complement magnet, has already been operated. Advantage is taken of the previous operation of the relay R–4 magnet to block or interrupt the tabulator action of the relay R–5 magnet when desired. To this end the armature 141 of the relay R–4 magnet is provided with an extension piece 142, which, as shown in Figs. 1 and 43 is moved downwardly when the magnet is energized, and, in so moving, takes a position closely engaging a nut 143 on a threaded stem 144. The upper end of this same stem 144 is attached to the latch 191a that is fixed to the shaft 146 and journaled at its ends in end bracket 147 suitably secured to the underside of the tabulator frame casting 148. Also fixed to this shaft 146 is an arm 149 to which is connected a dependent adjustable link 150 the upper end of which is pivotally connected at 151 to the rear end of the latch 138. It will therefore be apparent that, when the relay R–4 magnet is energized, the movement of the rear end of the latch 138 is prevented and therefore its front end cannot be moved by the energization of the relay R–5 magnet and, in this instance, the spring 137 will be stretched without initiating a tabulating operation.

It has been shown how the flick switch 131 is operated when automatic tabulation takes place to energize the relay R–5 magnet which results in an operating connection of the tabulating cam 140 with the shaft 54. The tabulating cam 140 has fixed thereto an associated cam 152 upon the periphery of which rides a follower roller 153 (Fig. 11). The roller 153 is carried on a stud 154 fixed to an arm 155 secured to a shaft 156 which is journaled at its ends in extensions formed on the frame casting 148. To this shaft 156 is also fixed an arm 157 (Fig. 10) to which is pivotally connected at 158 a dependent link 160 the lower end of which is provided with a slot 161 in which rides a pin 162. This pin 162 is fixed to the arm 122 so that when the arm is moved down during automatic tabulation, as previously described, the pin moves down ineffectively to the bottom of the slot 161. When, immediately thereafter, the tabulating operation starts, link 160 is forced down by the cam 152 and holds the pin 162 and the arm 122 down thus keeping the flick switch actuated until the tabulating cam 140 has completed its rotation which is controlled by a tabulator break switch on a tabulating head as will be hereinafter described.

Referring to Fig. 11 means are herein provided to give the tabulating cam 140 and its associated elements an initial actuation or slight forward movement as soon as they have been released. This means comprises a positioning cam 163 fixed to the tabulating cam 140 and having two high points 164. When the unit is in its normal position of rest a roller 165 bears on the cam 163 at one side of one or the other of the high points 164 as shown in Fig. 11. The roller 165 is mounted on a stud 166 fixed to the end of an arm 167 loosely mounted on the shaft 156 and is urged in a counter-clockwise direction by means of a spring 168. After the tabulating cam 140 has been disengaged from shaft 54, the pressure of the roller 165 tends to rotate the cams 140, 152 and 163, counter-clockwise so as to insure complete disengagement of the dog 130 from clutch wheel 130A by applying pressure to the pivot point of the dog 130 which coacts with the detent latch 138 to force and keep the nose of the dog out of contact with the wheel 130A.

With particular reference to Figs. 10 and 15, it will be noted that the arm 145 is provided with a laterally projecting pin 170. It will be clear from what has gone before that if the pin can be lifted, the latch 138 can be disengaged from the dog 130 by other means than through the operation of the relay R–5 magnet. These other means are the tabulating keys 171 shown in Figs. 1 and 3. It will also be noted that there are ten keys numbered from 1 to 10 inclusive. As will now be described the tabulating cam 140 can be caused to operate by depressing any one of the tabulating keys but the particular means for causing operation of the cam is slightly different when the number 1 key is actuated than when any of the other keys are operated.

It will now be shown how the cam is caused to operate when the number 1 key is operated:

Pressure on the number 1 key 171 will swing a bell-crank lever 172 (Fig. 1) to move its associated link 173 to the left as seen in Fig. 10. In the latter figure it will be seen that the link 173, at its rearward end, is provided with a shoulder 174 and a pin 175. When the link 173 is moved as above described the pin 175 encounters the lower end of one arm 176 of bell-crank lever 177 (Fig. 12) pivoted at 178 to the side of the frame casting 148. The other arm 180 of the bell-crank lever 177 is provided with a pin 181 which projects laterally therefrom and rides in a slot 182 formed in one arm 183 of a lever 184. The other arm 185 of the lever 184 is provided with an adjustable screw 186 adapted to engage the plate 113 of the rocking arm 114. The lever 184 is loosely mounted upon the shaft 115 which is journaled at its ends in ears formed on a comb plate 187 secured to the underside of the frame casting 148. The pin 181 has loosely mounted thereon a depending link 188 the lower end of which is provided with a slot 190 within which rides the pin 170. A spring 191, having one end connected to a pin 192 on the link 188 and the other end connected to the pin 170, serves to urge the pin 170 against the upper end of the slot 190. It will, therefore, be apparent that when the link 173 is moved the lever 177 is rocked and causes the depression of the adjustment screw 186 to thereby rock the frame 114 counterclockwise, as was previously described, causing the actuation of the flick switch 131. When the pin 181 and thus the link 188 are lifted, as above described, the strength of the spring 191 is such that the pin 170 is forced to move upward which will result in the operation of the cam trip latch 138 as previously described. Therefore, it will be seen that when the number 1 tabulator key is operated the cam trip latch 138 is released and tabulation takes place in response to the manual operation of the first key of the series.

When any of the keys 171 of the series from 2 to 10 inclusive are operated the associated links 173 are moved in the same manner as explained in connection with the number 1 key. The 2 to 10 links 173 are provided with pins 193 (Figs. 13 and 14) the ends of which are adapted to engage dependent fingers 194 of a comb plate 195 which plate is pivoted at 196 to the inner walls of the frame casting 148. The plate 195 (Fig. 5) is provided with a laterally extending finger 197 adapted to engage a stud 198 fixed to the arm 176 of the lever 177 (Fig. 12). The above construction is such that when any of the links 173 is moved, due to the depression of its associated key, the pin 193 thereof engages its associated finger 194 to rock the plate 195 clockwise (Figs. 13 and 14) which, as previously described, causes the raising of the link 188 (Fig. 10) to release the cam latch 138 to effect tabulation.

*Tabulator setting mechanism*

It has been explained that actuation of any of the 1 to 10 keys 173 effects rotation of the tabulator cam 140 whereby the setting of the tabulator mechanism is effected. The tabulator setting mechanism associated with the number 1 tabulator key is slightly different from that associated with the 2 to 10 tabulator keys and will be described first herein.

Referring to Fig. 12, the shaft 121 has fixed thereto two arms 200 the upper ends of which are formed integral with a bail member 201. The right hand arm 200 (Fig. 5) is provided with a follower roller 202 mounted upon a stud 203 (Figs. 12, 13 and 14). The roller 202 is tensioned to ride upon the periphery of the tabulator cam 140 by means of a spring 204 one end of which is connected to a comb plate 205 (Fig. 10) and the other end connected to an arm 206 also fixed to the shaft 121. Upon rotation of the cam 140, the bail 201 is moved rearward to contact a shoulder 207 formed on one end of an interponent 208 (Fig. 12). The other end of the interponent 208 is pivoted at 210 to a hammer arm 211 which in turn is pivoted upon the cross shaft 115. A spring 212 serves to urge the interponent 208 down into a position against the upper end of a lift link or push bar 213 wherein the shoulder 207 is normally in the path of the bail 201. The downward position of the interponent is limited by means of the push bar 213, the further function of which will later be described. A spring 214 one end of which is connected to the hammer arm 211 and the other end connected to a cross shaft 215 serves to restore the arm and interponent to normal position. When the hammer arm 211 is rocked clockwise (Fig. 12) by the bail 201, through the interponent 208, a setting of a tabulator slide corresponding to the number 1 tabulating position will be effected in a manner to be described.

It has been explained above that the setting of the tabulator mechanism by number 1 key 173 differs from that of the 2 to 10 keys which difference will now be set forth.

Referring to Fig. 13, it will be recalled that each of the 2 to 10 tabulator links 173 is provided with a shoulder 174 which moves rearwardly upon operation of its corresponding key. The shoulder 174 is adapted to engage a stud 216 fixed to the front end of a cam slide 217 slidably mounted within the previously described plate 187. Each of the cam slides 217 is provided with a cam portion 218 upon which rides a corresponding roller 220 mounted upon individual push bars 221. The upper end of the push bars 221 serves to limit downward movement of corresponding interponents 222 pivoted at 223 to hammer arms 224. Each of the interponents 222 is provided with shoulders 225 adapted, when the interponent is raised, to be in the path of the previously described bail 201. Each of the interponents 222 is urged in a clockwise direction by means of a spring 226 one end of which bears on the interponent 222 and the other end connected to the hammer arm 224. It will be noted at this point that all of the push bars 221 are shorter in length than the number "1" push bar 213 of Fig. 12 and therefore permit their associated interponents 222 to be lowered a greater distance whereby their shoulders 225 are normally out of the path of movement of the bail 201. It will be seen also that upon operation of the number 1 tabulator key 171 as previously described, the bail 201 will be brought rearwardly or to the right (Fig. 12) to move the number 1 interponent 208 but will not contact any of the 2 to 10 interponents 222 (Fig. 13). Upon operation of any of the 2 to 10 keys the shoulder 174 will engage and move the stud 216 and thereby the slide 217 to a position wherein the roller 220 and its corresponding push bar 221 is raised. The push bar 221 will in turn raise its corresponding interponent 222 to a position wherein its shoulder 225 is in the path of the bail 201. With the parts in the above moved position the hammer arm 224 corresponding to the depressed tabulator key 2 to 10 will move a corresponding slide in a tabulator head to tabulating position as will be later described.

It will be recalled that normally the number 1 interponent 208 is in the path of the bail 201. In order to prevent this interponent from setting a number 1 slide 228, upon operation of any of the 2 to 10 keys, the following mechanism is provided whereby this interponent is moved out of the path of the bail upon operation of any of the 2 to 10 keys. As was previously described each of the 2 to 10 tabulator links 173 is provided with a pin 193 for moving the comb plate 195 clockwise (Fig. 13). When the comb plate 195 is thus moved it engages and moves a pin 227 (Fig. 12) fixed to slide 228 associated with the number 1 push bar 213. The slide 228 is provided with a cam portion 230 upon which rides a roller 231 mounted upon the push bar 213. It will, therefore, be seen that when the comb plate 195 is rocked the cam portion 230 raises the roller 231 and the push bar 213 to in turn raise the corresponding interponent 208 to a position wherein its shoulder 207 is out of the path of bail 201.

Heretofore the key link 173 was shaped to provide the cam portion 230 as a integral part thereof and if the link 173 was retracted before the operation of the bail 201, the push bar 221 would be restored to normal resulting in a premature lowering of the interponent 222 and misoperation of the mechanism. In the present case the key links 173 can be retracted independently of and without effecting retraction of the corresponding slides 217 or 228. Therefore, novel means are herein provided for retracting the slides 217 and 228 independently of the links 173. Referring particularly to Figs. 12, 13 and 14, each of the slides 217 and 228 is provided with a pin 232 for cooperation with a dependent arm 233 of a lever 234 pivoted upon the shaft 121. Another arm 235 of the lever 234 is provided with a pin 236 which cooperates with an associated arm 237 also loosely mounted upon the shaft 121. A spring 238 one end of which is connected to the arm 237 and the other end connected to a third arm on the lever 234 serves to urge the pin 236 against the arm 237. The arm 237 is provided with a shoulder 240 which lies in the path of the bail 201. The above construction is such that when the bail 201 is moved rearwardly (to the left Fig. 14) it engages the shoulder of the arm 237 thereby rotating the arm in a counter-clockwise direction. Due to the tension of the spring 238 the lever 234 also tends to rotate in a counter-clockwise direction whereby its arm 233 will engage and move the pin 232 thereby restoring its associated slide 217 or 228. It will be seen that should the tabulator key 171 be kept in a depressed position during the restoring action of the bail 201 the spring 238 will simply stretch without effecting counter-clockwise movement of lever 234. When restoration of the slides 217 and 228 is permitted by the release of the corresponding key 171, the slides will be moved forward (to the right of Fig. 14) whereby the rollers 220 and 231 will again engage the lower levels of the corresponding cam portions 218 and 230. It will be noted that the above restoring action takes place during the setting movement of the bail 201 and that the push bars 213 and 221 may be lowered before setting is completed. In order, therefore, to prevent those interponents, which have been actuated, from following the restoring movements of their associated push bars before setting and tabulation has been completed, the hook portion formed by the shoulders 207 and 225 engage the upper surface of the bail 201 during substantially the entire forward and rearward movement of the bail.

It will be noted at this point that as long as any one of the 1 to 10 keys is depressed the latch 138 is released, the flick switch 131 is actuated and the corresponding slides 217, 218 and interponents 213 and 221 are operated.

As in the above mentioned Patent 2,364,759, the tabulating cam 140 rotates for a part of one revolution in order to make a proper tabulating set-up and completes its revolution upon the completion of the tabulating operation. The latter part of the cycle is utilized for restoring the various operated parts to normal.

In order to effect the stopping of rotation of the tabulator cam 140 during the tabulating part of the cycle the latch 138 (Fig. 11) is pivoted at 151 to an upwardly extending arm 242 the upper end of which supports a pin 243 on the rearward arm of a lever 244. A spring 245 one end of which is connected to the rearward arm of the lever 244 and the other end connected to the comb plate 205 serves to urge the lever 244 in a clockwise direction. The forward arm of the lever 244 is provided with a hook portion 246 adapted to engage the dog 130.

The above construction is such that upon depression of any of the 1 to 10 keys the latch 138 is released as above described to allow rotation of the tabulating cam 140. When the latch 138 is thus released the arm 242 is raised against the tension of the spring 245 thereby rocking the latch lever 244 to position the hook portion 246 thereof in the path of the dog 130. In this position the hook portion 246 is adapted to engage the dog 130 to disconnect the cam 140 from the shaft 54 upon the completion of one half revolution of the cam, and the pressure of the roller 165 on cam 163 assists in forcing disengagement of the dog and holding it in released position with respect to wheel 139A.

During this first half revolution of the cam 140 the cam 152 secured thereto serves to actuate the flick switch 131 and hold it in its actuated position to retain the relay R-5 magnet energized. The cam 140 in turn drives bail 201 rearward to rock one hammer arm 211 or 224 to setting position. During this rearward movement of the bail 201 the corresponding slide 217 or 228 is restored to normal provided the associated key link 173 has been released. If by the end of the above half cycle the link has not been released the above structure functions in the same manner except that the slide 217 is retained in its rearward position. It will be seen that the above structure assumes the position described as long as the relay R-5 magnet is energized.

As will hereinafter be described, the full tabulating operation takes place during the first half cycle of the cams 140 and 152 and the carriage is fully brought to its tabulated position before the start of the second half cycle of the cams.

The second half cycle of the cams is initiated when the relay R-5 magnet is deenergized whereby the hook portion 246 is brought out of the path of the dog 130 and the trip latch 138 into the path thereof. In this manner the cams 140 and 152 will be clutched to the shaft 54 for the second half cycle until the dog 130 engages latch 138. During this last half cycle the tabulating cam 140 permits the bail 201 to be restored to its normal position (Fig. 13) under tension of spring 204 (Fig. 10) while the hammer arm 224 is restored under tension of its spring 214 and limited in its restoring movement by the comb plate 205.

It will thus be apparent that this mechanism provides such related parts that when the key is depressed and then immediately released, the slides are at once restored to normal position and the remaining parts are restored as soon as the bail 201 is restored to normal position. This sort of construction allows the key to be operated by the merest flick of the finger to achieve tabulation without the necessity of holding the key down even for the first denominational order. Thus, also, when any tabulating key is depressed by the finger the proper hammer arm and only that arm is placed in operative position to achieve the necessary and proper tabulating operation. It is also to be noted that whether tabulating takes place in response to the automatic mechanism on the carriage rack or by the depression of the manual tabulator keys, the flick switch 131 is closed to hold the parts in position until the tabulating operation is completed.

*Tabulator head and slides*

Whenever tabulation occurs either due to the operation of the automatic mechanism or to the depression of one of the keys 171 the rocking of the hammer arms 211, 224 will, in a manner to be described, set certain mechanism for stopping the carriage at a desired column or decimal position. Referring particularly to Figs. 1 and 16 to 19 inclusive, when any of the hammer arms 211, 224 is rocked rearwardly a corresponding slide 250 is moved rearward to rock a corresponding lever 251 about a pivot 252 suitably secured within the usual tabulator casing 253. The upper ends 254 of each of the levers 251 are nested within slots 255 formed in slides 256 mounted for lateral movement within the casing 253. The slides 256 are each provided with vertical extensions 257 which are graduated in length in such a manner that the shortest of the extensions is adapted to actuate the lowermost of a bank of slides 258 and the longest to actuate the uppermost slide of the bank (Fig. 19). The slides 258 are arranged to slide flat in a horizontal plane one above the other and are each provided with a slot 260 in which the extended ends 257 are secured. Each of the slides 258 is provided on its forward edge with a single stop lug 249 which, when a slide 258 is projected through the initiation of a tabulating cycle as above described, will lie in the path of the tabulating stops 247 and 248 (Figs. 35 and 36) for arresting the carriage.

As has been previously described, the flick switch 131 is actuated so that the relay R-5 magnet is energized to cause rotation of the tabulating cam 140 to effect movement of a predetermined hammer arm 211, 224 during the first half cycle of the cam 140. This operation causes rocking of the corresponding lever 251, slide 256 and a slide 258 whereby the carriage may be arrested in a predetermined position by the stops 247 and 248 engaging a lug 249. Upon arrest of the carriage, as above described, it is necessary to restore all of the operated mechanisms to normal so that another tabulating operation may take place.

Referring particularly to Figs. 18 and 19 the entire bank of slides 258 are suitably formed and so nested within the tabulator casing head that when disposed thus they normally assume a position at a slight angle to the front and rear axis of the head and therefore are normally slightly laterally displaced. The slides 258 are resiliently held in this displaced position by means of a vertical plate 261 which bears against the sides of the slides due to the tension of a spring 271. When the carriage is tabulated and a stop 247 or 248 abuts against a lug 249, its corresponding slide is moved to the left (Fig. 18) thereby moving the plate 261 to the left against the tension of spring 271. When the plate 261 is thus moved, a pin 262 slidably mounted in the left wall of the casing 253 is also moved leftward to thereby rock a plate 263 whose forward end is hinged within a slot 264 (Fig. 16) formed in a front plate 265 suitably secured to the casing 253 by screws 266. The plate 263 is thus rocked outward from the casing against the tension of the spring 271 and is provided with an adjustment screw 272 whereby the normal relative position between the casing 253 and the plate 263 may be preadjusted. The rearward end of the plate 263 is guided for lateral movement within a slot 267 formed in an extension 268 of a rear plate 270. The plate 263 is provided with a depending portion 273 which, when the plate is moved outward as above described, actuates an element 274 of a tabulator release switch 275 the function of which will be described in connection with the circuit diagram.

It will be noted at this time that the same operative idea is adapted for the top plate of the nested group which is designated as a skip stop slide plate 259. When this plate is moved it also moves the vertical plate 261 to effect opening of the tabulator release switch 275.

It is evident from the above that, when the carriage is tabulated, a slide 258 is advanced whereby its associated lug 249 is encountered by a step 247 or 248. No matter which slide 258 or 259 is thus advanced, when it is struck by a stop the meeting causes the particular slide to be displaced laterally to push the pin 262 toward the left in Fig. 18 to move the plate 263 and open the switch 275. The effect of this opening on the operation of the tabulating mechanism and its bearing on related circuit operations will be clear from the later description of the circuit operation. At this time it will be noted that opening of the switch 275 will break the circuit for the relay R-5 magnet, so that the trip latch 138 (Fig. 11) is again moved to its clockwise or dog engaging position and simultaneously the hook portion 246 is moved out of engagement with the dog 130. When this occurs the tabulating cam 140 is again rotated to complete its last half of the cycle until the dog 139 is arrested by the trip latch 138. During this last half cycle of the tabulating cam 140 all the parts will be restored to normal position as shown in Fig. 13.

Modified tabulator head

The tabulator head has been modified to give a more even application of power to the slides. This is accomplished by changing the simple levers 251 to compound levers 426 and 427 as shown in Fig. 44. The levers 426 are pivoted at 428 and each is connected through a pin 430 and slot 431 to one of the levers 427. The levers 427 are pivoted at 432. Each lever 427 terminates in a tongue 433 of a length sufficient to reach its associated slide 256a mounted for lateral movement in the casing 253a. The lower end of each of the levers 426 is urged forward by a spring 434 the other end of which is attached to a bracket 435.

The operation of the contacts 275 has been modified. A plate 263a has been substituted for the plate 263. This plate is formed with ears 436 adapted to be loosely mounted on pins 437 mounted in ears 438 formed in the front and rear plates 265a and 270a. A spring 271a urges the plate 263a against the pin 262a. As before when any of the slides 253a are moved outward the plate 261a is moved to the left to press the pin 262a outward against the plate 263a to force it outward against the tension of the spring 271a to operate the contacts 275a otherwise the tabulator heads remain as before.

Control slides and switch operation

As fully disclosed in the above mentioned Patent 2,364,759, movement of the carriage effects operation of certain control slide plates 276 and 277 (Figs. 1, 7, 16, 17 and 19) mounted at the top to the tabulator casing 253. The plates 276 and 277 are disposed above the tab and skip stop slides 258 and 259 respectively and are provided with beveled front edges adapted to be engaged by upper and lower control cams 278 and 280 respectively (see Fig. 1) mounted on top of the tabulator stops in desired positions along the tabulator rack 187 in order to effect certain circuit results which will be described more fully later. These slides open and close selectively a plurality of control contacts which in Fig. 1 are generally and inclusively given the number 285 although later in the description of the circuit operation they may be separately designated in order to set forth their individual function and operation.

Automatic tabulation after carriage return

Various means have been described above for initiating automatic tabulating operations of the carriage.

In addition, improved means have been provided whereby the carriage, after it has been automatically returned, will be tabulated automatically to the first selected writing position of the next line, i. e., where a stop 247 has been placed on the rack bar 107.

Referring to Figs. 8 and 9, a cam plate 286 extends upward from the rocking frame 110 and is adapted, when the carriage is returned, to be moved by a cam 288 formed on a plate 287 secured to the rack support arm 283 (Fig. 9). This will cause the rocking of the frame 110 which will result in the operation of the flick switch 131 as previously described.

In operation, it will be seen that, when the carriage is returned in the usual manner the cam 287 strikes the cam plate 286 at which time the flick switch 131 will be operated. The flick switch remains actuated until the carriage is arrested by the usual marginal stop which effects closing of the contact 104 (Fig. 6). Upon closing of the contact 104 the flick switch, being operated, will in turn initiate the automatic tabulation of the carriage whereby the carriage is moved to the left until arrested by the first stop 247 on the rack bar 107. This feature is of great advantage in that the carriage must be fully returned to the margin stop before automatic tabulation can take place thereby insuring proper pick-up of the cross truck automatically.

*Decimal and column selection*

It has been described above how the automatic tabulating trips 106 are employed for initiating operation of the tabulating mechanism and how the stops 247 and 248, movable with the carriage, are adapted to be arrested by the lugs 249 on the stop slides 250.

The stops 247 are used for selecting decimal positions and the stops 248 are used for selecting columnar positions of the carriage. The tabulating keys 171 are numbered so as to indicate columnar positions and may be colored in a manner to indicate decimal positions of the carriage. It will be noted at this point that the decimal tabulating keys 171 are also utilized in the present machine for column selection so that either a decimal or a column position of the carriage may be selected upon the merest flicking of any of the tabulating keys.

The machine may be set up in either of two ways, i. e., for automatic tabulation, or manual tabulation of the carriage. The automatic tabulation set-up will now be described.

When the machine is set up for automatic tabulation the automatic trips 106 are employed for automatically tripping the tabulating mechanism for tabulating the carriage to certain predetermined positions. The stops 247 (Fig. 35) are of uniform size and have an edge 281 which is adapted to strike any one of the lugs 249 (Fig. 18) which has been moved by the tabulating mechanism.

As an example of operation, assume that there are six columns in which entries are to be made. If in the first column the amount 123.45 is to be entered a decimal stop 247 is placed on the rack bar 107 in a position representing the hundreds of dollars, i. e., the position for printing the first digit of the entry. At this point it will be recalled that the carriage is automatically returned to the beginning of the next line of writing following the completion of the totaling operation for the preceding line. Toward the end of the carriage return operation the cam portion 288 cams the plate 286 (Fig. 8) to thereby operate the flick switch 131 as above described. Operation of the flick switch causes the initiation of a tabulating operation and moves the lowermost slide 250 forward whereby its lug 249 is moved into the path of the stop 247 to thereby arrest tabulating movement of the carriage in the position to print the first digit of the amount which in this case is the number 1.

At this point it will be noted that all the amounts to be entered in one column do not necessarily have three digits to the left of the decimal as in the present example. In order, therefore, to bring the carriage to the proper denominational position to print the first digit or the digit of highest order of the amount, the operator first determines the predominant highest order of all the amounts that are expected to be entered in that column. A stop 247 is then placed in the corresponding position on the rack 106 whereby the carriage may be properly tabulated to that predominant denominational order position. If, upon inspection of the amount to be entered, it is found that the first digit is of a higher order than the predominant order, the carriage is back spaced manually to the proper order. Also, if the first digit is of lower order, the carriage is forward spaced. For example, if the stop 247 is set to arrest the carriage at the predominant order for hundreds of dollars as in the present case and it is desired to enter an amount such as 1123.45, the carriage after it has been tabulated to the hundreds of dollars position is back spaced manually one space to bring it to the thousands of dollars position. Also, if it is desired to enter 23.45 the carriage is forward spaced one space because the first digit is in the tens of dollars order.

After the carriage has been properly positioned at the first printing position as above described, the operator proceeds to enter the first three digits, i. e., 1, 2 and 3, after which the carriage escapes one space to the decimal position. No printing takes place in this position and, therefore, in order to automatically move the carriage to the next printing position for printing the number 4 of the example, another trip 106 and a stop 247 are used. The trip is placed on the rack 107 in a position corresponding to the decimal position and the stop 247 is placed in the position corresponding to the number 4 printing position. Accordingly, when the carriage escapes to the decimal position as above described the trip 106 in that position operates the flick switch 131 to tabulate the carriage to the next stop position which in this case is the position in which the number 4 is to be printed. The 4 and 5 are then printed and another automatic tabulating trip 106 is placed in the next denominational order position following the 5 so that when the 5 is printed and the carriage escapes to the next space the automatic tabulating trip 106 will become effective to automatically tabulate the carriage into the next column which, in the example, is the second. If in this column the amount of 678.90 is to be printed a stop 247 is placed in a position on the rack bar 107 corresponding to the hundreds of dollars column in which the six is to be printed. It will be readily seen that when the number 5 of the previous column has been printed the carriage will automatically tabulate to a position determined by the next stop 247 on the rack bar 107 wherein the number 6 is printed. The digits 78.90 are then printed as in the first example. In a similar manner, tabulation of the carriage may be automatically controlled for the balance of the columns as desired.

The machine may be set for manual tabulation when the selection of the highest denominational digit position for the entries is such as to necessitate much of the operator's time to forward and backspace the carriage from the predominant position. In this case the automatic trip stops 106 are dispensed with and a decimal tabulator stop 247 (Fig. 35) is placed at the decimal position for each column to be selected. After writing the last digit of the column, the operator depresses one of the tabulating keys in accordance with the denominational position the carriage is to be arrested.

For example, assume that the amount 123.45 is to be the entry in the next column. It will be recalled that the decimal stop 247 is placed at the decimal position for each column. It is necessary therefore, to arrest the carriage three spaces to the left of the decimal position. Now, if the number 1 key (Fig. 3) will normally stop the carriage at the decimal position, it will be seen that in order to stop the carriage three spaces to the left of the decimal it is necessary to depress the number 4 key. The carriage will then be arrested in a position wherein the number 1 is printed. Similarly if the amount to be entered is to be 1234.5 it will be seen that the number 5 key will cause the carriage to be arrested four spaces to the left of the decimal. In other words, the arrangement of the keys 171 is such that depression of the number 1 key will cause the carriage to be arrested at the decimal position, depression of the number 2 key will cause the carriage to be arrested at the units position, depression of the number 3 key will cause the carriage to be arrested at the tens position, etc.

It will be noted at this point that the tabulator stops used in the above example are each provided with a striking edge 281 terminating short of the top portion of the stop so that the stop may be arrested by any of the lugs of the stop plates 258, but not by the lug on the skip stop plate 259. Therefore, decimal selection can be made only upon the operation of the 1 to 9 tabulator keys 171. The number 10 tabulator key is then used whenever it is desired to skip through any of the columns. In the latter case, however, the striking edge 281 of the tabulator skip stop must extend to the top edge thereof for cooperation with the lug on the skip stop plate 259. This construction gives the skip stop a dual function, i. e., one as the decimal selector and the other as a skip stop.

It has been described that the machine may be preset in a manner whereby the carriage will automatically tabulate into certain predetermined columns wherein entries are to be made. Also, that the machine may be preset in a manner whereby the carriage may be decimally tabulated upon operation of any of the tabulating keys 1 to 9.

In certain other cases, wherein entries have to be made in various columns depending upon the particular classification of the entry, it is desired to selectively tabulate the carriage into any one of a group of columns. In other words, assuming there are six columns on a sheet of which only three, i. e., 2, 4 and 6 are to receive entries on the same line of printing, the operator will first tabulate the carriage directly to the second column to make the entry, then directly to the fourth column to make the second entry, and then directly to the sixth column for the final entry. Similarly, if on the next line of printing it is desired to make an entry on only the first and fifth columns, the operator first tabulates the carriage to the first column to make the entry, and then directly to the fifth column to make the final entry on that line.

The means for accomplishing the above column selection includes a plurality of column selector stops 248 (one shown in Fig. 36) ten in number corresponding to the number of tabulator keys 171 (Fig. 3). The stops may be placed on the rack bar 107 in a similar manner as the decimal stops 247 and arranged in spaced relation to conform with the distances between the columns in which entries are to be made. Each of the stops 248 are provided with a single striking lug 269 adapted to be arrested by a corresponding lug 249 formed on its corresponding tabulator stop slide 258 or 259. Therefore, there is a stop 248 with a single lug 269 for cooperation with a corresponding lug 249. The above arrangement is such that, if it is desired to arrest the carriage in the second column, the number 2 key 171 is depressed which will cause the number 2 lug 249 to arrest the carriage at the second collumnar position. The first column selector stop 248 having its lug 269 out of the path of the lug 249 will not be arrested thereby. In a similar manner, the carriage may be arrested at any columnar position in accordance with the particular tabulator key depressed while all those preceding stops will not have lugs in alignment with the projected lug 249.

It will be noted that the column selector stops 248 need not be placed at the beginning of a column but at any predominant position within a column the same as is done with the decimal tabulator stops 247. Also, with the above arrangement, a selection of a greater number of columns than there are keys (10 shown in Fig.3) can be accomplished by first tabulating the carriage to its maximum collumnar position which in this case is the tenth column, and then depressing a second key to tabulate the carriage to a position corresponding to the second tabulator key depressed.

In addition to the above, the machine may also be preset so that tabulation may be accomplished both manually and automatically. Taking for example a case wherein an amount is to be written having, besides a decimal, space positions between hundreds, thousands and millions, such as the amount 1234567.89. The decimal position is set up in much the same manner as for manual tabulation, as above described, i. e., the decimal stop 247 is placed at the decimal position so that the proper depression of the decimal key, which in this case is the number 8 key, causes the carriage to be arrested at the units of millions position to print the number 1. In order to automatically space the carriage through the first comma position, i. e., from 1 to 2, a trip stop 106 is placed at the comma position and a column selector stop 248 having a lug 269 for cooperation with the number 1 lug 249 is placed at the number 2 position. It will be seen therefore, that after the number 1 is printed and the carriage escapes to the comma position, the trip 106 effects automatic tabulation of the carriage and the stop 248 arrest the carriage in the next position to print the 2. In the same manner a trip placed at the second comma position, i. e., between 4 and 5, and a stop 248 placed at the number 5 position enables the carriage to space automatically between the 4 and 5 positions and be arrested in the position to print the 5.

It has been described that the column selector stops 248 are each provided with a single lug 269 for cooperation with a corresponding lug 249 whereby the carriage may be tabulated to any desired predominant position in a selected column; the decimal tabulator stops 247 act to arrest the carriage at a preselected decimal position of a column in accordance with the particular tabulator key depressed; and the trips 106 act to tabulate the carriage automatically until the number 1 lug 249 arrests the travel of a decimal stop 247 or a column selector stop 248 which has a lug 269 in the number 1 position.

With the above arrangement, it will be seen that the full complement of the tabulator keys 1 to 10 may be used to tabulate the carriage manually either for decimal tabulation for printing on one portion of a sheet or for column selection for printing on the same line of another portion of a sheet. In addition to the above, it is also possible with the present machine to combine column selection with decimal selection for automatic and/or manual operation as desired within a single set of columns. Assume, for example, that entries are to be made in five columns of a sheet and it is desired to make use of column selector stops 269 for manually tabulating the carriage to any selected column as described above. In addition, assume that it is desired to make use of stops 247 to decimally tabulate the carriage to denominational positions in accordance with the key depressed and to make use of the trip and stop combination for spacing through the decimal position. As described above each of the column selector stops 248 has a single lug 269 for cooperation with a corresponding lug 249 so that the topmost lug 269 (Fig. 36) will cooperate with the topmost lug 249 (Fig. 16) the next lower lug 269 cooperates with the next lower lug 249 etc. Assume, then, that if only five stops 248 are used each having lugs 269 for cooperation with the first top five lugs 249, it will be seen that depression of tabulator keys 6 to 10 would cause the carriage to tabulate to any selected one of the five columns according to the key depressed. Let us assume also that the decimal tabulator stop 247 is altered in a manner to have a striking edge 284 sufficient to cooperate with the lowermost five lugs 249, depression of any of the keys 1 to 5, therefore, will tabulate the carriage to any denominational order position in a column in accordance with the particular key depressed. It will be seen therefore, that with the above arrangement of the stops, i. e., stops 248 having lugs to cooperate with the first five top lugs 249 only and the stops 247 having a striking edge to cooperate with the first five bottom lugs 249 only, that depression of any of the keys from 1 to 5, for instance, will not extend the lugs 249 into the path of any of the lower five lugs 269 and vice versa. It will also be seen that projection of the lowest lug 249 operated by a trip 106 would only effect tabulation of the carriage until the next succeeding stop 247 is arrested by the lug.

As an example of the above, assume that entries are to be made in the five columns mentioned. The machine may then be preset by placing a trip 106 in a position corresponding to the decimal position of the entry for each column and a decimal tabulator stop 247 at the position corresponding to the tenths position of the entry. A column selector stop 248 is then placed in a position corresponding to the predominant digital position of the entry in each column and arranged in a manner wherein the stop cooperating with the topmost lug 249 is placed at the fifth column position, the stop cooperating with the next lower lug 249 is placed at the fourth column position, etc.

In operation, and with the machine preset as above, the carriage comes to rest at the first digital position after automatic carriage return as above described. The operator proceeds to make the entry until the trip 106 in the decimal position causes the carriage to escape automatically to the tenths position wherein the printing of cents takes place. After the last digit in a column has been printed the operator may tabulate the carriage for decimal selection or column selection as desired. If decimal selection is desired, the operator depresses a key 1 to 5 to tabulate the carriage to the proper denominational digit position for the printing of the entry as above described. If, on the other hand, it is desired to skip through the second column so as to make an entry into the third column, the operator depresses the number 8 tabulator key whereby the carriage is arrested at the predominant position in the third column. In the same manner, the operator may tabulate from column to succeeding column or skip as many columns as desired, or may decimally tabulate from one column to the succeeding column.

It will be understood that while the above arrangement can be accomplished by using five column selector stops 248 for cooperation with five lugs 249 and five decimal tabulator stops 247 for cooperation with five remaining lugs 249 that other arrangements can be made in accordance with the particular problem on hand as long as the combination of stops 248 and 247 total the same number as tabulator keys (10 in the present case).

Automatic proof symbol printing

Whenever the totalizer is in a clear state during total taking operations the machine is conditioned to print a clear symbol. This is accomplished in the Patent 2,364,758 for example, by means of a comb 368 which, when it senses the clear state of numeral wheels, moves a finger 370 into the path of the usual cam 372 to establish a circuit to the symbol printing mechanism. When one or more of the numeral wheels of lower denomination are set at zero however, the comb rocks to its clear position before the totalizer completes its full travel and thereby moves the finger 370 into contact with the cam 372 to thereby establish a circuit to the printing mechanism prematurely. In order to avoid this condition, the machine disclosed in the patent is provided with such necessary holding circuits whereby the printing of the symbol is delayed until the entire register is sensed and returned to its normal position. Further, in view of the fact that the register has to return to its full right hand position before a symbol is printed much time is consumed before subsequent operations can take place.

The present machine, therefore, provides means whereby the aforementioned holding circuits are dispensed with and a more simplified structure is utilized for printing the symbol immediately following the sensing of the last digit of the totalizer, whether significant or not, and before the totalizer is returned to normal.

For this purpose the combination clear signal and add one device for the cross totalizers disclosed in the application of E. F. Thierfelder Serial No. 548,909, filed August 10, 1944, now Patent No. 2,473,738, issued June 21, 1949 is used.

Referring to Fig. 27 herein, each digital position of the cross register has the usual carry gear 297 rotatively mounted upon a cross shaft 298 which is secured to the totalizer side plates 300. Each of the carry gears 297 is adapted to be rotated by the usual master wheel (not shown) as the cross totalizer is moved step by step past the actuating mechanism. Each of the carry gears 297 is in mesh with an intermediate gear 301 rotatably mounted upon a cross shaft 302 secured to the side plates 300 and each intermediate gear 301 in turn is in mesh with a gear 303 secured to a numeral wheel 304 rotatably mounted upon a cross shaft 305 secured to the side plates 300. At this point, it should be clear that each of the carry gears 297 is in turn rotated by the cross actuator master wheel, (not shown), and that the motion is transmitted by means of the intermediate gear 301 to the gear 303 for setting the number dials in accordance with the rotation of the master wheel. The above mechanism so far is usual in Remington bookkeeping machines. In cooperation with the above mechanism means are employed for determining the state of the totalizer, i. e., clear or not clear and the position of the last significant digit other than zero. It will be seen that each of the numeral gears 303 has a shortened tooth 306 so that when the numeral wheels 304 are rotated, the shortened teeth 306 will assume various positions according to the setting of the numeral wheels. Lying against the outer edge of each of the gears 303 is a sensing element 308 rotatably mounted upon a cross shaft 310 secured to the side plates 300. Each sensing element 308 forms one element of a bell-crank, the other upstanding arm 311 of which is pivotally connected by a link 312 to the lower arm 313 of a bell-crank lever of which the other upstanding arm 314 thereof projects out of the casing of the totalizer. This bell-crank is pivoted at 315. For each numeral wheel there is provided an independent combination of elements including the sensing element 308 arm 311, link 312, and bell-crank lever 313, 314. When the wheel 304 is in a position representing a digit other than zero the regular teeth 307 on it will cause the above lever system to assume the position shown in Fig. 27 in which case the fingers 314 will project substantially straight up.

The operation of this device for add-1 purposes is clearly set forth in the Thierfelder application and so will not be described in detail here.

To summarize it will be seen in Figs. 3 and 4 of the Thierfelder application referred to above and in Fig. 27 of this application that the totalizer, the fingers, the plate 316 and the relay R-8 are part of a circuit which is closed whenever there is at least one finger in contact with the plate 316 but that this circuit is broken when the last upright finger passes beyond the plate to the position where the digit related to it is to be printed, the breaking of this circuit causes the ten's complement instead of the nine's complement of that particular digit to be printed.

When all the numeral wheels are set at zero and thus indicate that the totalizer is clear, means are provided that are settable under these conditions to permit a clear symbol to be printed. In Fig. 27 there is a universal bail element 319 pivotally supported by a shaft 320 extending between the side plates of the totalizer. This bail has spaced slots through which the rear portions of the links 312 extend. Each said link 312 has a laterally projecting stud 321 disposed thereon in front of the bail 319 and when the link 312 is moved rearward by the stud the latter swings the bail counter-clockwise. Each link 312 is connected to one end of a spring 322 the other end of which is attached to some fixed member such as 323 in the machine and this spring tends to keep the link in a forward position and thus tends to press the sensing element 308 against the teeth of the pinion 303. As shown in Fig. 27 the element 308 is resting on one of the regular teeth of the numeral wheel pinion and consequently the link 312 is in rearward position and the finger 314 connected thereto is in the raised or upright position to contact the plate 316 when the totalizer moves past said plate. Since the bail 319 is contacted by the lugs 321 on all of the links 312 it is obvious that as long as one link is in rearward position, indicating a numeral other than zero in at least one numeral wheel, the bail 319 will be maintained in the position shown in Fig. 27.

At its right end the bail is itself provided with a stud 324 which is adapted to bear against the shouldered upper end of one arm of a bell-crank 325 the other arm 327 of which is forked as at 328. This forked portion receives the end of an arm 330 rotatable on the shaft 298 and forming part of a quadrant member 331 having teeth meshing with a gear 332. The latter carries a sensing disc 333 rotatable with the gear on shaft 334 and having a sensing tooth 335. It is clear that when the upper end of arm 325 is pushed back by the stud 324 on the bail 319 the tooth 335 will be moved into one position, and when the bail is allowed to swing counter-clockwise as the link 312 moves forwardly, a spring 336 fastened at one end to the arm 325 and at the other end to a fixed member 337 in the machine will cause the movement of the tooth 335 to another position. Therefore it is to be noted that when the sensing elements 308 are all resting on the low teeth 306 of the pinions 303 of the numeral wheels 304, the bail is allowed to move back to normal, the arm 325 is allowed to move forward, and the finger 335 is permitted to move to a position where it will engage a sensing finger (not shown) to print a clear symbol in a manner similar to the sensing of the teeth by sensing fingers in the above mentioned Roggenstein patent. This mechanism is also disclosed in the Thierfelder application above referred to.

In order to permit free and unimpeded rotation of the numeral wheels when necessary such as during clearing or item entry, means associated with a master dog 338 of well known type are provided. During item entry when the wheels have to be turned, this dog is operated by the actuator mechanism shown in the above mentioned patents to back the truck in position on which the totalizer is mounted and also operates a lever 340 the lower end of which engages the dog 338 when it is operated. This lever is pivoted at 326 and has an upper portion 341 provided with a rounded projection 342 adapted, when the lever is swung by the dog 338, to engage and swing a usual stop bar 343. This type of bail is shown in the above mentioned Thierfelder application. It is provided with an extra extension bail portion 344 having a dependent hook portion 345 normally lying above and out of contact with a rearwardly extending lip such as 346 on each sensing element arm 311. This bail 344 extends across the machine and is pivotally supported at 347. When the dog 338 is operated the bail 344 is moved counter-clockwise as shown in Fig. 3 of the Thierfelder application, and very slightly lifts the sensing elements 308 from pressure contact with the teeth of the pinions 303 so that the wheels may be free to be turned whenever that is desired. Since the dogs are only operated temporarily the sensing elements 308 are restored to normal position before the totalizer is allowed to move to the next position. This latter device is therefore actuated during item entry or the rotation of the numeral wheels to free them momentarily from the retarding effect of the sensing element pressure.

*Cross truck locking device*

In the well known Remington cross truck pick-up mechanism the cross truck is picked up and released by each of the vertical registers as the carriage travels from right to left and returns to its extreme right hand home position each time that the usual pick-up beam is cammed away from a vertical register pick-up foot. This results in an undesirable back and forth motion of the cross truck which is not only detrimental to the mechanism itself, but it is a cause of considerable annoyance to the operator of the machine as well. The present machine provides means to hold the cross register truck in its "locked-out" position whenever the carriage is tabulated through one or more banked or otherwise spaced vertical registers especially in connection with column selection.

Referring to Figs. 21 and 22, the cross totalizer 88 is placed upon a cross truck 87 which is provided with an extension 348 adapted to be engaged by a hook 350 pivotally mounted upon the right hand side of the usual actuator frame. Attached to the hook 350 is a flexible pull wire 351 which at its lower end is hooked around a pivot pin 352 extending through an arm 353 of a U-shaped bell-crank 354. The bell-crank 354 is pivotally mounted upon a shaft 355 (see also Fig. 2) suitably secured at its ends in the vertical and cross actuator side plates. Pivoted on the pin 352 is a depending adjustable link 356 which at its lower end is connected to one arm 357 of a bell-crank 358. The bell-crank 358 is pivotally mounted upon the numeral key sub-lever shaft 80 (Fig. 1) and has a depending arm 360 which at its end has a cam portion 361 adapted to be cammed by an operating roller 362 mounted upon the lever 363. The lever 363 is pivotally mounted upon a shaft 364 which is retained within a groove formed in a bracket 365. The lever 363 is provided with an arm 366 having a roller 367 which normally rests upon an extension 368 of armature 370 operable under control of an electro-magnet 371. The electro-magnet 371 is mounted in any suitable manner on the usual relay mounting plate of a machine.

It will be seen that, if the electro-magnet 371 is energized, the extension 368 of the armature will raise the roller 367 thereby rotating the lever 363 in a counter-clockwise direction. This will result in the camming of the bell-crank lever 358 in a counter-clockwise direction, thereby pulling the link 356, the pull wire 351 and the hook 350 downward. The hook is then brought into latching engagement with the extension 348 on the cross truck 87 to hold the cross truck in such latched position until the electro-magnet 371 is deenergized.

The electro-magnet 371 is energized through operation of the flick switch upon depression of any of the tabulator keys so that the hook 350 is operated to latch the cross truck. As the carriage travels from right to left it causes the cross truck 87 to be picked up and through the momentum the truck is thrown to the extreme left where it is latched. This is more clearly shown in Fig. 21 wherein it will be seen that the vertical totalizers 85 are banked and that the first totalizer, upon depression of a tabulator key 171, has freed itself from the usual pick-up beam 372 because the totalizer has passed out of the computing zone. The pick-up foot 373 of the next vertical totalizer 85 catches the pick-up beam 372 and pulls the cross truck to the left and through momentum moves the extension 348 into a position behind the hook 350 so that the hook holds the cross truck 87 until the electro-magnet 371 is deenergized. This is a desirable feature especially when a plurality of vertical totalizers are used since after entering an amount in the first register, it may be desired to enter an amount into the fifth register. Formerly, each of the vertical totalizers passing through the computing zone to the left picked up the cross truck and released it as it passed out of the zone. The cross truck being spring tensioned toward the right would then slam toward its extreme right hand position each time that it was released. With the present locking device the next vertical totalizer 85 to the right of the one leaving the computing zone will pick up the cross truck and throw it to its locking position where it will remain until the electro-magnet 371 is deenergized. Thus, the cross truck 87 will not be picked up and slam to its home position for each vertical totalizer 85 passing through the computing zone.

It will be seen from the above that operation of the flick switch 131 through the depression of any of the tabulator keys 171 will effect the locking out of the cross truck during tabulation through one or more vertical registers. Similarly, therefore, the cross truck will be locked out during automatic tabulation due to the operation of the flick switch as has been described.

In addition to locking out the cross totalizer during manual and automatic tabulation the cross truck may also be locked out manually. Referring to Fig. 22, a link 374 is provided at its lower end with an elongated slot 375 through which passes the pin 352 which pin is journaled at its ends in the arms 353 of the bell-crank 354. The link 374 is pivotally connected at 376 to the rear end of the manually operable lever 377 which is pivotally mounted at 378 to the right hand side of the actuator frame. The slot 375 is so located as to allow the downward movement of the pin 352, when the link 356 is operated by the electro-magnet 371, without affecting the manual lever 377. By manually raising the lever 377 the link 374 can be depressed to effect the counter-clockwise rotation of the bell-crank 354 to pull down the truck lock hook 350 and latch the cross truck 87 in its extreme left hand position. A notched detent bracket 380 yieldably retains the lever 377 in either of its two positions. It will be noted at this point that locking out of the cross truck 87 by means of the lever 377 will retain the truck in locked position independently of the energization or deenergization of electro-magnet 371. The circuit for the electro-magnet 371 will be fully described in the electrical description of the machine.

*Improved pick-up mechanism*

As set forth previously, the cross truck is "picked-up" by a vertical totalizer through the medium of the pick-up beam 372 each time that the vertical totalizers approach the computing zone as the carriage moves from right to left unless the cross truck is "locked-out" by the hook 350.

Due to the necessity of the pick-up for each entry into a new column, the constant engaging of the pick-up beam with the pick-up foot on the vertical totalizers puts a tremendous strain on the right hand side plates of the totalizer. This has resulted in distortion of the side plates to cause blocking of machine operations.

The present machine provides means whereby the above distortion of the side plates is entirely eliminated. Referring particularly to Figs. 25 and 26, each vertical totalizer 85 is provided with a pick-up bar 381 which extends between the side plates 300 and is secured thereto in any suitable manner such as by screws 382, (Fig. 20) and locating pins 383. The rear face of the bar 381 is provided with teeth 384 which are adapted, when the totalizer is placed in the proper position on the main truck 86 (Fig. 2), to mesh with teeth 385 on the front face of the truck. It will be noted at this point that the previously mentioned pick-up foot 373 formerly made integral with the side plate 300 of the register is now made integral with the pick-up bar 381 for preventing distortion of the plate 300 even after substantial repetitious use.

The usual means for securing the vertical totalizers upon the truck 86 has been presently modified. Formerly the side plates 300 were formed with tapered portions which when a totalizer was placed upon the truck assumed a position behind associated tapered portions on the truck. For purposes of this feature the tapered portions have been removed from the upper part of the totalizer plates 300 and the usual locking device only is used. This locking device has been disclosed in previous Remington patents but for the present purpose permits improved use when employed in cooperation with the pick-up device.

Referring to Fig. 20, a cross shaft 386 has suitably secured at its right hand end a lever 387 having an operating button 388. The rear end of the lever 387 is provided with a hook portion 389 adapted to cooperate with the tapered or bevelled portion 390 on the upper edge of the truck 86 so as to prevent front to rear displacement of the totalizer 85. The rear end of the lever 387 is also provided with an extension 391 adapted to fit within teeth on the upper surface of rack 392 to prevent lateral displacement of the totalizer 85. The shaft 386 is journaled at its ends in the side plates 300 and has secured at its left hand end an arm 393 shaped at its rear end with a hook similar to the hook 389 of lever 387 to assist also in preventing front to rear displacement of the totalizer 85. The lever 387 and arm 393 are urged in a clockwise direction by means of a sping 395 one end of which is connected to a pin 396 on the side plate 300 and the other end connected to the arm 387.

The above construction is such that when a vertical totalizer is to be placed on the truck 86 the lever 387 and arm 393 are rocked to the extreme counter-clockwise position against the tension of spring 395 to thereby retain the extension 391 and hook portions 389 out of engagement with the rack 392 and the tapered portion 390 respectively. The totalizer is then first placed with the teeth 384 of the pick-up bar 381 in mesh with the corresponding teeth 385 of the truck 86. While the teeth are still in mesh, the upper portion of the totalizer is brought rearward to its extreme position wherein the lever 387 is released to bring the hook portion 389 into engagement with the tapered portion 390 and the extension 391 into mesh with the teeth of the rack bar 392. It will be seen, therefore, that with the above construction the totalizer may be mounted upon the truck from the front of the machine rather than from the left to right the length of the truck. The totalizer may be removed from the truck by reverse operation i. e., rocking the lever 387 and arm 393 counter-clockwise to disengage the portions 389 from the tapered portion 390 and the extension 391 from the teeth of the rack 392 and then disengaging the teeth 384 and 385.

The above described mechanism will eliminate the aforementioned undesirable results and substantially improve and prolong the life of the vertical totalizers. It was formerly necessary to slidably remove some totalizers endwise from the truck 86 to insert another totalizer in an intermediate position. With the above described mechanism a totalizer may be inserted in any position along the truck 86 without removing any of the other totalizers. When it is desired to remove a totalizer it is only necessary to "pick" it off the truck without having any effect upon the position of the balance of the totalizers.

*High speed mechanism*

The present invention provides a digit selecting device which will space at high speed over the digits to the left of the first significant digit of a total, and which is under control of carriage motion from right to left. Heretofore, this type of spacing was controlled by a space magnet which through suitable linkage, such as is shown in Fig. 7 of the previously mentioned Patent 2,364,759, engaged a snatch pawl with a snatch roller which in turn operated the escapement mechanism. The usual electrical connections are employed whereby the sensing of insignificant digits results in the energization of the spacing relay for automatically spacing the carriage. With the present device, however, the escapement mechanism is actuated more directly from the space relay.

The present device provides rapid spacing over insignificant "nines" as well as "zeros" and is a desirable feature during the printing of either negative or positive balances. It is an especially desirable feature when employed in connection with large capacity totalizers, i. e., where a large number of insignificant digits are present before the first significant digit to be printed thereby requiring a large percentage of the complete total printing time for spacing through these insignificant digits.

Referring particularly to Figs. 23 and 24, a spacing relay 397 is mounted on a bracket 398 which bracket is in turn mounted on the usual relay plate and is suitably located adjacent the tabulator unit (Fig. 4) in the power base 51 of the machine. The spacing relay 397 is preferably disposed in a vertical position and has an armature 400 to which is secured an extension 401. In its normal position the upper end of the extension 401 assumes a position adjacent a pin 402 secured to a slide link 403. The right hand end of the slide link 403 is provided with an elongated slot 404 through which passes a stud 405 secured to a bracket 406 which is in turn suitably secured to the frame 50. The other end of the slide link 403 is pivoted at 407 to a lever 408 (Fig. 24). The lever 408 is fulcrumed on a pivot 410 supported by a bracket 411 formed integral with a bar 412 extending from front to rear. The left hand end of the lever 408 is provided with a shoulder portion 413 adapted to engage and move an arm 414 which is connected in a well known manner to the escapement rocker arm 415 (see Fig. 1) for the purpose of letter spacing the carriage. Also fixed to the bar 412 is a right angle bracket 416 having an adjustment screw 417 for holding the lever 408 in the proper position against the arm 414.

The above construction is such that upon the energization of the spacing relay 397 its armature 400 is attracted to its core thereby rocking the extension 401 to slide the link 403 to the right (Fig. 23) which in turn rocks the lever 408 clockwise (Fig. 24) to rock the arm 414 thereby spacing the carriage.

*Shift key operation of R-4 relay contacts*

When printing of a positive automatic balance is desired and the typewriter carriage has previously been shifted by hand in the course of entering a credit balance amount the machine would proceed to take the credit balance from the totalizer, but, due to the shifted carriage and reversal of the actuator the amount to be cleared would be added to the amount already registered in the cross foot totalizer. It can be seen that such an operation would not be fool-proof and for this reason as part of the present invention automatic disconnect mechanism and associated circuits are introduced as illustrated in Fig. 43.

This same device is directed to remedy the situation when the carriage is tabulated to an automatic date column with the carriage shifted without the operator's knowledge to prevent the date type arm from operating while not in position to print due to the absence of type in the upper case position in the date box.

To these ends relay R-4 is provided with two sets of mechanically operated contacts in one bank. These two contacts are normally closed contacts 422 and 423 in the negative circuit of relay R-4 and the normally open contacts 424 and 425 in the circuit of relay R-1. The last two mentioned contacts are adapted to be operated by a shift pull wire 144 referred to as a threaded stem. This wire passes through a hole in the extension piece 142 of the armature 141 of the relay R-4. Thus, it will be seen that the actuation of relay R-4 and the consequent motion of its armature will pull the stem 144 downward.

Figure 28:
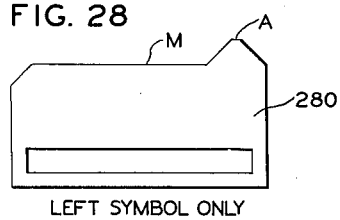

In addition to this automatic operation of the stem 144 there is also provided a mechanical linkage to the manual carriage shift key as shown in Fig. 43. This discloses the same structure as shown in Figs. 26, 27 and 28 of Roggenstein's Patent No. 2,412,537 with the exception of the make and break contacts on the relay R-4.

The operation of the automatic and manual carriage shift is described in columns 11 to 14 inclusive of the above mentioned Roggenstein patent so that it will not be described in detail here. The carriage 63 has a cross bar 176a supported by wheels 175a riding on a rail 174a the rail 174a has several posts 177a by which it is supported. Each of said posts will be pivotally secured to a bell crank 178a these bell cranks are so connected to each other and to a push link 183a that when the push link 183a is raised the carriage 53 is raised into shifted position. The lower end of this push link 183a is substantially directly above the power shaft 54 near the left hand end thereof. Mounted loosely on the shaft 54 is an assembly comprising a cam 184a and a detent cam or disc 185a. The latter has a concentric outline interrupted by two notches adapted to be engaged by a roller 186a mounted on a spring pressed lever 187a so as to retain the disc and with it a cam 184a in either the normal position shown in Fig. 43 or in another position about 80° removed from normal. The cam 184a has pivoted thereto the usual clutch dog 188a adapted for cooperation with the usual toothed wheel 190a fast on the continuously rotating shaft 54. The parts are held in the normal position shown by a latch 191a pivoted on a stationary stud and drawn up by a spring 193a in position to arrest the dog 188a and force it out of engagement with the wheel 190a. A second latch 194a above the cammed assembly is adapted to arrest the dog 188a and the cam assembly after about a half revolution. This clutch mechanism is more fully described in the cited Roggenstein patent. As there described the construction is such that when the latch 194a is in the path of the toothed wheel 190a the latch 191a is out of the path of this wheel and vice versa.

The cam 184a is adapted to operate a follower roller 202a mounted on the end of an arm 203a pivoted at a stationary stud 204a said roller bearing on the top of the cam. As shown in Fig. 27 of the last cited Roggenstein patent the push link 183a is adapted to follow the motion of this roller arm 203a and is pushed upward to effect the shift. The case shift mechanism is brought into use when writing negative totals by the latch 191a being drawn downward by a link 144a connected with an arm 142a of the armature 141a of an electro-magnet R-4. When in entering items it is desired to reverse the normal direction of the operation of the computing mechanism and to print an item in distinctive type the case shift mechanism is brought into operation by means of the credit balance key 173a. Without reversing the computing mechanism it can be brought into operation by means of the case shift key 216a or the shift lock key 217a. To this end the rear end of a lever 218a bears on a coupling member 197a so that a counter clockwise rocking of the lever will depress that member and bring the case shift mechanism into operation. The lever 218a is rocked by a pin and slot connection 222a with the key lever 223a on which the case shift key is mounted.

In the Remington machine the power driven case shift mechanism is also utilized to shift the reversing mechanism of the computer. To this end the usual shaft 225a carries the arm 227a to which the link 172a is pivoted and has also at its forward end a small gear sector 228a meshing with another gear sector 230a on an additional shaft 231a lying parallel with the shaft 225a. This shaft 231a has at its rear end an arm 233a which is connected by a link 234a with an arm or bracket 235a secured to the link 183a near the upper end of the latter. The construction is such that when the said link is shifted upward for upper case, it rocks the shaft 231a clockwise. The clockwise rotation of the shafts 231a may be imparted to the sector 230a which will rotate the shaft 225a counter clockwise and reverse the computing mechanism. Said shaft 225a also has at its rear end an arm 236a which operates the bicolor ribbon mechanism of the machine and sets it for printing in red.

The shift lock key 217a and its associated mechanism and operation are as described in the cited operations of the Roggenstein Patent 2,412,537.

It can be seen that if the operator has shifted the carriage manually by depressing the credit balance 173a or the shift key 216a, the shift cam trip latch 191a is rotated in a counter clockwise direction causing the push wire 144 to actuate the make and break contacts in the third bank of relay R-4. The make contact is in series with a break contact on the second bank of this relay. This contact being normally closed when relay R-4 is deenergized.

Both of these contacts are used to obtain a circuit causing energization of relay R-1 known as the starting relay as will presently be more fully described. As long as this relay remains energized the automatic total printing feature is disconnected.

*General operation and circuit description*

The circuit involved in the present machine is, generally speaking, of the same general character as that shown and described in the above mentioned Patent 2,364,759 with such omissions and additions as are consistent with the present invention. In the present circuit there are omitted the Auto-Tab holding switch, the Carriage Return and Intermediate Stop Switch, the Timing Magnet, the special relay for the Star and Triangle symbols, the Credit Balance button, the Starting solenoid button, and the T. M. switch, all shown in the above mentioned patent.

As is seen in Figs. 37 to 40 inclusive, the present circuit utilizes eleven relays namely relays R-1 to R-9 inclusive, R-12 and the Key Lock Relay.

The relay R-1 (Fig. 39) is a slow release relay which must be energized during tabulation and deenergized before automatic printing can take place. The function of this relay is to delay the printing of an automatic total or automatic date so that the carriage can settle after tabulating or skipping to a total or automatic date column. It also gives the carriage and actuator an opportunity to shift into a negative position. The relay R-1 is provided with a make contact SH for relay R-4, a dual break contact COM, a make contact AC and an R-5 break contact for the relay R-5 tabulator circuit and an R-2 Key Lock break contact.

The relay R-2 (Fig. 39) is the Space-Zero relay which is utilized for changing the impulses from the space relay R-7 to the cipher or zero solenoid after any numeral from 1 to 9 inclusive is printed to the left of a decimal point and to print ciphers to the right of the decimal point. The relay R-2 is provided with a break contact DIS for relay R-1, a break contact for relay R-3, break-make contacts for space and zero respectively, a make contact for relay R-2 lock and a make contact for sub-symbol.

The relay R-3 (Fig. 38) is the Transfer relay and is used to electrically separate the left cross register from the right cross register. This relay is provided with a break-make contact for relay R-4 (shift relay), a break-make contact for Space, a break-make contact for add-1 relay (R-8), a make contact for relay R-3 lock, break-make contacts for symbols and sub-symbols respectively, and break-make contacts for Symbol relay R-6. In addition to the above contacts the relay R-3 is provided with the usual break-make contacts from 0 to 9 inclusive.

The relay R-4 (Fig. 40) is the Shift and Nine's Complement relay used to shift the carriage, actuator, ribbon, and the contacts for nine's complement in automatic credit balance operations. The above relay R-4 is provided with a break contact for the relay R-1 negative circuit, a break contact for the relay R-4 negative circuit, a make contact for the relay R-1, a make contact for relay R-4 lock, a make contact for relay R-5, make contacts for relay R-2 and the Key Lock Relay (Fig. 37), break contacts for relays R-8 and R-9 and make contacts for the A. C. circuit. In addition to the above contacts the relay R-4 is provided with the usual break-make contacts for the numerals 0 to 9 inclusive.

The relay R-5 (Fig. 40) is the Tabulator and Add-1 for Ten's Complement relay and is provided with a break-make contact for the Key Lock Relay, make contacts for relays R-8 and R-9 and make contact for relay R-5 lock. In addition to the above contacts the relay R-5 is provided with the usual break-make contacts for numerals 0 to 9 inclusive.

The relay R-6 (Fig. 39) is the Symbol relay and controls the printing of proof symbols. This relay is provided with a make contact for relay R-1, a break contact for relay R-5 and a triple make contact for relay R-6 lock, Symbol and relay R-9.

The relay R-7 (Fig. 39) is the Space relay and is used to control the spacing of the carriage up to the first digit and through the comma and decimal positions of an automatic total. This relay is provided with a break contact for relay R-9 and a make contact for relay R-2.

The relay R-8 (Fig. 39) is a slow release relay and is used to control the add-1 and tabulation. This relay is provided with a make contact for relay R-2 and key lock, a make contact for the A. C. circuit, a break contact for relay R-5 (when used for add-1), and a make contact for relay R-5 (when used for tabulation).

The relay R-9 (Fig. 39) is the Common relay for controlling the return circuit through which the current returns to the positive terminal of the rectifier when any solenoid is energized. This relay is provided with a make contact for the Common circuit and a make contact for the Symbol.

The relay R-12 (Fig. 39) is the Truck Lock Relay for holding the cross truck locked out to the left while tabulating through one or more vertical register columns and is not provided with any control contacts.

The Key Lock Relay KL (Fig. 37) is for locking the keyboard while tabulating and while automatic printing takes place. This relay is not provided with any control contacts.

Figure 37:
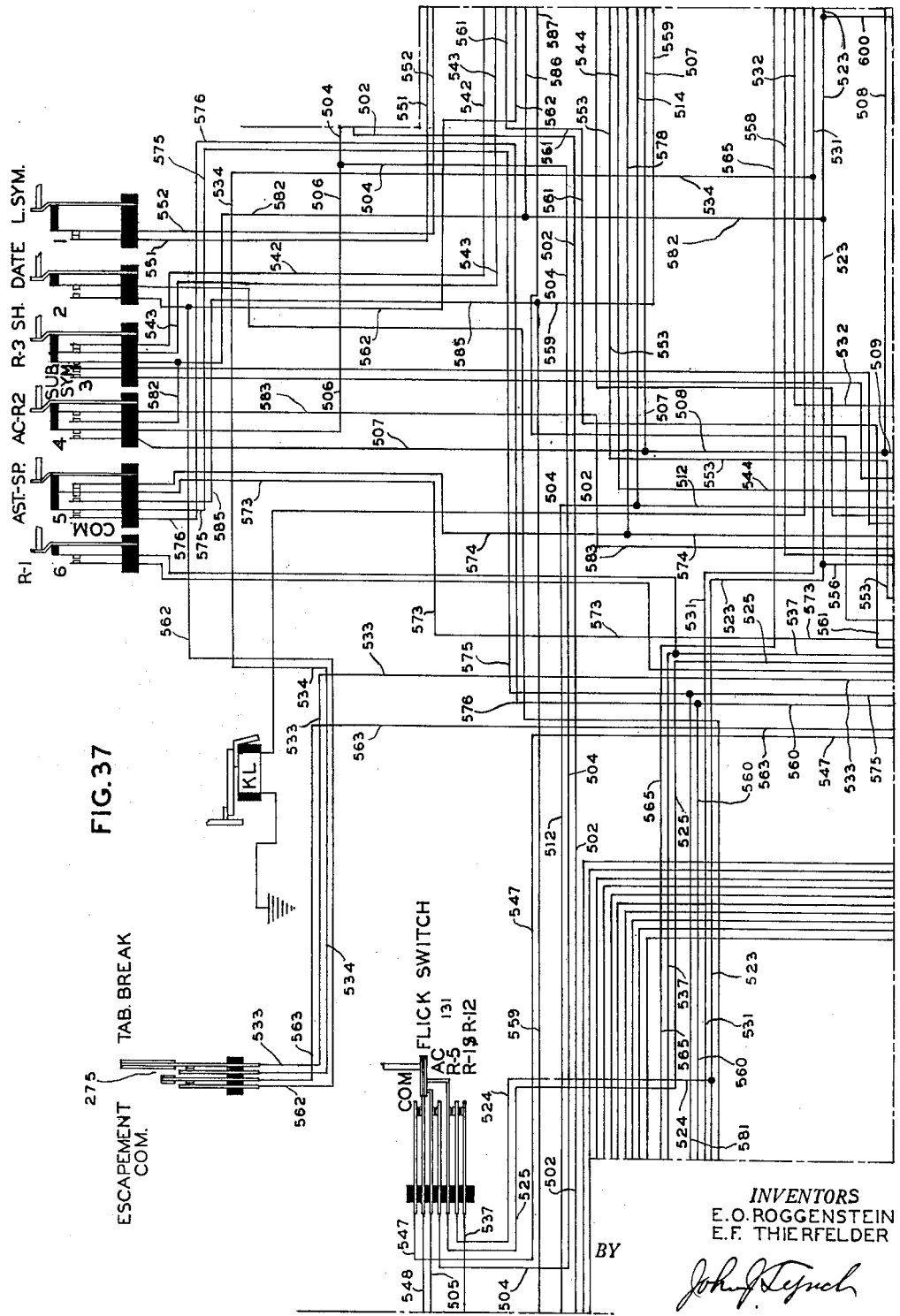

In addition to the above relays and their control contacts, the present circuit is provided with other contacts which are under control of the various machine operations. Referring particularly to Fig. 37 the flick switch 131 (see also Fig. 2), previously described in connection with tabulation, consists of four contacts. The COM break contact is for insuring the deenergization of relays R-2, R-3, R-4, R-6 and R-9 and the printing solenoids for the next automatic column. The AC make contact is for supplying the rectifier with current for tabulation. The R-5 make contact is for energizing relay R-5 as soon as possible after depression of the tabulator key. The R-1—R-12 make contact is to energize relays R-1—R-12 on tabulation.

Referring to Fig. 38 the present circuit is also provided with the usual full stroke pawl and disconnect lever contacts. The mechanical arrangement of this switch is shown in Figs. 35–37 of Roggenstein's Patent No. 2,412,537 and described in column 16 of that patent. The timing contact has been eliminated in the present device. The R–1 contact is a make contact used to keep relay R–1 energized if the operator tabulates to automatic column with the disconnect lever locked down. The R—2 contact is a make contact to energize relay R-2 when the first figure preceding the decimal point prints automatically so that the sensing of any ciphers following will cause printing of ciphers rather than spacing of the carriage. The COM contact is to break the return circuit for numeral and symbol solenoids and to deenergize relay R-9.

Also, as is shown in Fig. 37, two break contacts, Tab-Break and Escapement COM, are provided. The Tab-Break (276 Fig. 16) is for the purpose of releasing the tabular mechanism when a tabulator stop 247 or 248 strikes a tabulator stop slide 258. The Escapement COM contact is opened during spacing operations to thereby prevent the Common relay R-9 from reenergizing until the carriage has moved a complete space.

The previously described contact 104 Fig. 6 is the carriage return contact Carr. Ret. (Fig. 38) and is used for breaking the AC contact to the rectifier when the carriage is returned by power.

There is shown in Fig. 38 an AC make-break contact operated by the cross truck labelled Cross Truck AC contact. The purpose of this contact is to establish a circuit to the rectifier when the cross truck is in a picked-up position at that point where a manual proof symbol is to be printed automatically, only in columns provided with automatic proof symbol cams. Another purpose of this make-break contact operated by the cross truck is to interrupt the A. C. circuit when the cross truck is locked to the left, which is one space to the left of the symbol print position. This contact is used only on machines which have manual proof with automatic symbols.

As previously described, movement of the carriage effects automatic circuit operations through the actuation of upper and lower contact plates 276 and 277 (Figs. 1 and 17) by upper and lower control cams 278 and 280 respectively. These control cams 278 and 280 are shown in detail in Figs. 28 to 33 inclusive.

The control cam 280 shown in Fig. 28 is the Left Symbol Control Cam and is provided with two cam surfaces A and M for differentially moving its associated lower control plate 277 for purposes to be hereinafter described.

Figure 29:
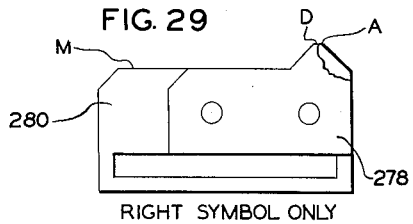

The lower control cam 280 shown in Fig. 29 is the Right Symbol Control Cam and is provided with two cam surfaces A and M for differentially moving the lower control plate 277. Secured to this lower control cam 280 is an upper control cam 278 which is provided with cam surfaces D for differentially moving its associated upper control plate 276.

Figure 30:
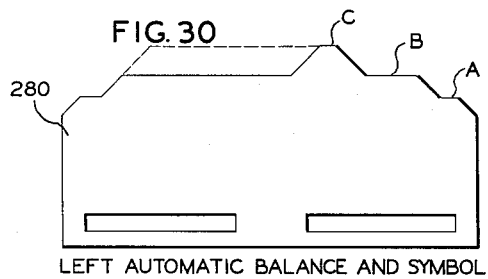

The lower control cam 280 shown in Fig. 30 is the Left Automatic Balance and Symbol Control Cam and is provided with cam surfaces A, B and C for differentially moving the lower control plate 277.

The lower control cam 280 can be modified as shown by the dotted line in Fig. 30 to form a Special Asterisk Prefix Control Cam. Essentially the modification consists in extending the level C across the space occupied by the original level B for a purpose to be described later.

Figure 31:
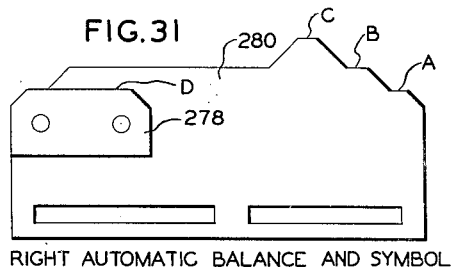

The lower control cam 280 shown in Fig. 31 is the Right Automatic Balance and Symbol Control Cam and is provided with cam surfaces A, B and C for differentially moving the lower control plate 277. This control cam has secured thereto an upper control cam 278 having a cam surface D for cooperation with the upper control plate 276.

Figure 32:
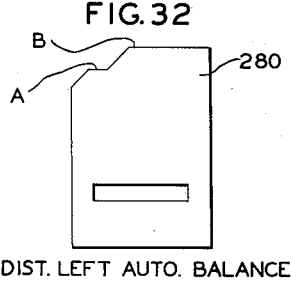

The lower control cam 280 shown in Fig. 32 is the Distribution Left Automatic Balance Cam and is provided with three cam surfaces A, B and C for cooperation with the lower control plate 277.

Figure 33:
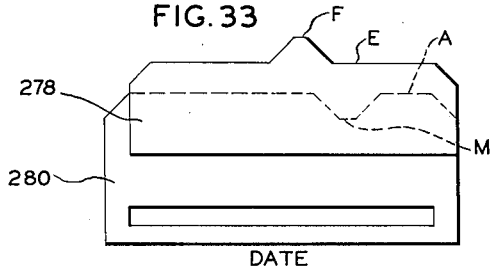

The lower control cam 280 shown in Fig. 33 is the Date Control Cam and is provided with two cam surfaces A and M. This cam has secured thereto an upper control cam 278 having two cam surfaces F and E for cooperation with the upper control plate 276.

The lower control cam 280 in Fig. 34 is the Special Asterisk Prefix Cam and is provided with three cam surfaces A, B and C for cooperation with the lower control plate 277.

From the above it will be seen that the lower control cams 280 are provided with cam surfaces A, B, C and M for cooperation with lower control plate 277 and the upper control cams 278 are provided with the upper control plate 276.

The control plates 276 and 277, when moved, are adapted to open and close, selectively, six banks of control contacts 285 (Fig. 1) mounted upon the rear of the tabulator casing 253. The first, second and third banks of contacts (shown schematically in Fig. 37), are under control of the upper control plate 276 and the fourth, fifth and sixth banks are under control of the lower control plate 277.

The first bank has a single left symbol break contact which is opened when a cam surface contacts the upper control plate 277.

The second bank of control contacts has a make contact Date. The contact Date is closed when cam surface F contacts the control plate 276.

The third bank of control contacts includes a break contact for the left shift SH and two make contacts R-3 and Sub SYM. The contact SH is opened when a cam surface D on the upper control cam 278 contacts the upper control plate 276, the R-3 contact is closed when a cam surface D contacts the upper plate 276 and the contact SYM closes when a cam surface E contacts the upper plate 276.

The fourth bank of control contacts includes two make contacts AC and R–2. The AC contact closes when a cam surface A on a lower control cam 280 contacts the lower control plate 277 and the contact R–2 closes when a cam surface C contacts the lower control plate 277.

The fifth bank of contacts includes one set of transfer contacts, a break contact SP and a make contact ST (*) and a make contact COM. The SP contact opens when a cam surface C on the lower control cam 280 contacts the lower control plate 277, the ST contact closes when a cam surface C on the control plate 280 contacts the plate 277 and the COM contact closes when a cam surface B contacts the plate 277.

The sixth bank of control contacts has one make contact R–1 which is closed when a cam surface B on any distribution cam 280, except the last, contacts the lower plate 277.

Having thus described the essential elements of the present circuit a general description of its operation will now be given.

As in the above mentioned Patent 2,364,759 current is supplied to the present circuit by means of the transformer 500 from the secondary of which an upper wire 501 and a lower wire 502 extend. The transformer 500 serves to provide A. C. current to a rectifier 503 which in turn provides direct current to all of the relays and solenoids. The A. C. circuit (to supply the rectifier with current) is established when any of the previously described tabulator keys 171 is operated and when the automatic tabulator trip 106 causes the actuation of the flick switch 131. Whenever the flick switch 131 is actuated as above described both the A. C. contact and the relay R-5 contact are closed before the tabulator cam latch 138 is tripped. When the AC and R-5 contacts are thus closed the relay R-5 is energized to trip the tabulator cam and the cam holds the AC contact and the relay R-5 contact closed until tabulation is completed and the tabulator cam restores to rest position. When the AC contact is closed current is supplied to the rectifier 503 from the secondary of the transformer over wire 501 through the fuse to one of the AC terminals of the rectifier. From the other wire 502 of the transformer current will flow to and through the Carr. Ret. contact 104, over wire 504 to and through the AC contact in the flick switch 131, now closed, over wire 505 to the other AC terminal of the rectifier.

In order to make printing of automatic balances and dates effective only when the carriage is tabulated to the proper columns, an A. C. circuit can be established through the AC contact in the fourth bank of control contacts. This circuit can only be established if any of the following contacts have been closed: AC contact on relay R-1, AC contact on relay R-4 or AC contact on relay R-8. These AC contacts work in conjunction with each other and, upon tabulating to an automatic balance or sub-balance column, relay 1 and relay 8 are energized simultaneously and current will flow from one terminal of the secondary over wire 501 to one AC terminal of the rectifier 503. From the other terminal of the secondary current will flow over wire 502 to and through the Carr. Ret. contact 104, over wires 504 and 506, to and through the AC contact on the fourth bank of control contacts (which is closed as soon as the carriage reaches an A surface of an automatic tabulating cam, Figs. 30 and 31) and continues over wire 507 to the short outer arm of the AC contact operated by the Cross Truck. Current will also flow over wires 508, 509, 510 and 511 to the long leaf of respective AC contacts on relays R-4, R-1 and R-8. Since both relays R-1 and R-8 are energized during tabulation current will flow to and through their respective AC contacts over wires 511, 512, 513, 514, 515 and over wire 505 to the AC terminal of the rectifier. Relay R-8 deenergizes momentarily after the carriage reaches its destination, but as the AC contact on relay R-1 retains the circuit, the relay R-8 is permitted to deenergize without interrupting the A. C. circuit. As soon as the tabulator stop slide returns to rest position relay R-8 reenergizes before relay R-1 releases inasmuch as relay R-1 is a slow release relay. Thus the A. C. circuit is retained throughout the printing of a positive automatic balance or sub-balance. When negative balances are being printed relay R-4 is energized and its AC contact is closed. This contact is wired parallel to the AC contacts on relays R-1 and R-8 and inasmuch as relay R-1 is deenergized at this time and relay R-8 deenergized for the ten's complement their AC contacts will open. Therefore, current will now flow over wire 502, to and through the carriage return contacts, over wires 504 and 506, to and through the AC contact on the fourth bank of the control contacts and over wires 507 and 508, to and through the AC contact on relay R-4, over wires 515, 512 and 505 to the other AC terminal of the rectifier.

As explained above, the cross truck AC contact provides still another path for the AC when it is desired to print a manual proof symbol automatically when the cross truck is in a picked-up position at that point. This alternative circuit is provided from one side of the transformer 500 over wire 501 through the fuse to one side of the rectifier 503 and from the other side of the transformer 500 over wire 502 to and through the Carr. Ret. contact 104, over wires 504 and 506, to and through the AC contact on the fourth bank of control contacts and over wire 507 to and through the cross truck AC contacts and over wires 514, 512 and 505 to the other AC terminal of the rectifier.

The two outside positive plates 516 and 517 of the rectifier 503 are connected by a wire 518 and the positive plate 516 and the center negative plate 520 are shunted by a condenser. This circuit now provides direct current for the operation of the several relays and solenoids and is under control of the carriage and tabulating keys by means of the AC contacts and carriage return break contact 104.

It has been described that the flick switch 131 is actuated whenever tabulation is performed either automatically by means of the automatic tubiator trip 106 or manually by the operation of any of the tabulating keys 173. When tabulation takes place by actuation of the flick switch 131 relays R-5, R-8, R-1 and R-12 (truck lock relay) are energized and operate in conjunction, each relay performing a special function. Relay R-5, it may be recalled, serves to trip the tabulating cam 140 on automatic operations and is energized as follows:

From the negative terminal of the rectifier 520 (or ground 521), over wire 522, over wire 523, over wire 524, to and through R-5 contact of the flick switch (now operated), over wire 525 to the long leaf of R-5—Tab contact on relay R-8 and over wire 526 to the short leaf R-5 break contact on relay R-1. Also, over wire 526 to the outer short leaf of the dual make lock contacts on relay R-5. The contact R-5 on relay R-1 being closed, current will flow through same over wire 528 to the negative side of relay R-5. The return circuit for relay R-5 is from the positive side of the coil over wire 530 to and through the closed R-5 return break contact of relay R-6 over wire 531, to the positive side of the rectifier.

The R-5 contact on relay 1 is included in the relay R-5 tabulating circuit in order to energize the relay R-5 immediately without waiting for its controlling circuit through relay R-8 to energize it. It will be noted at this point that the R-5 contact of the flick switch closes before the R-1 contact of the flick switch, thereby permitting current to pass through the R-5 contact on the relay R-1 before the relay R-1 is energized.

When the relay R-1 is energized its R-5 contact is broken, but R-8 is energized over break contact R-8 and R-9 on R-4 to provide negative supply to R-5 over R-5 contacts on R-8. When R-4 is energized to break contacts R-8, R-9 a circuit to R-8 and R-9 is completed over contacts R-8, R-9 of R-5 as follows:

From ground 521, over wire 522, over wire 523, to and through the R-8—R-9 contact of R-5, over wire 532, to the negative side of the relay R-8. The return circuit for relay R-8 is from the positive side of its coil over wire 533, to and through the tab-break contact (normally closed), over wire 534, and over wire 531 to the positive side of the rectifier.

The relay R-5 is held energized through the LOCK contact on relay R-5 due to the closing of the R-5-TAB contact when the relay R-8 is energized as above described, this holding circuit being described as follows:

From ground 521, over wire 522, over wire 523, to and through the contact LOCK on R-5, over wires 526 to and through the contact R-5 on relay R-8 (now closed), over wire 536 and over wire 528 to the negative side of the coil of the relay R-5. The return circuit for the relay R-5 is as above described.

It will be noted at this time that the relay R-1 is energized shortly after the relay R-5 is energized as follows:

From ground 521, over wire 522, over wire 523, over wire 524, to and through the flick switch contact R-1, over wire 537, to the negative side of the coil. The return for the relay R-1 is from the positive side of the coil over wire 538 and over wire 531 to the positive side of the rectifier. When the relay R-1 is thus energized its R-5 contact is broken. However, as this occurs after relay R-8 is energized this relay R-5 remains energized through the R-5 contact on relay R-8.

As has been described energization of the relay R-5 causes the tabulator cam 140 to rotate for one half a revolution in order to make the proper tabulating set-up and to release the carriage. The carriage then tabulates to the left until a tabulator stop abuts the lug of an actuated tab-stop slide 258 (Fig. 16) whereby the carriage is arrested. During this tabulating movement of the carriage the relay R-5 remains energized. However, at the time the carriage is arrested the tab-break contact 275 (see also Fig. 37) is opened to thereby break the circuit to the relay R-8. This causes the R-5-TAB contact on relay R-8 to open breaking the circuit to the relay R-5. When this occurs the tabulating cam 140 is again released as previously described and completes its last half revolution to restore the tabulating mechanism to normal.

The relay R-12 is included in the above relay R-5 circuit in order to automatically lock out the cross truck 87 when tabulating through any column over which a vertical register is placed. The relay R-12 is energized each time that tabulation takes place. When the flick switch 131 is operated, the relay R-12 is energized as follows:

From the negative plate of the rectifier, over wire 522, over wires 523 and 524, to and through flick switch contacts R-1 (now closed), over wire 537, over wire 540, to the negative side of the relay R-12 coil. The return circuit for the relay R-12 is from the positive side of its coil, over wires 541 and 533, to and through the tab-break contacts 275 and 274 (normally closed), over wire 534 and over wire 531 to the positive plate of the rectifier. The relay R-12 remains energized during tabulating operations, and is deenergized when a tubulator stop strikes a tabulator stop slide 258, whereby the tab-break contact is broken to deenergize both relays R-8 and R-12. Relay R-8 is a slow release relay and, therefore, relay R-12 will deenergize first to release the cross truck before relay R-8 breaks the circuit for relay R-5, after which relay R-5 deenergizes and restores the tabulator cam latch 138, allowing the carriage to settle.

It will be recalled that relay R-5 is adapted to serve two purposes, viz., that of initiating automatic tabulating operations as above described, and shifting its associated bank of contacts to their ten's complement values during an add-one operation. This operation, as is well known in the Remington type of bookkeeping machines, takes place only during the printing of negative totals after the usual shift to the nine's complement has taken place. The function of the relay R-5 as a ten's complement relay is fully described in the above mentioned Patent 2,364,759, and only so much of it will be described herein as is consistent with an understanding of the present invention. It is understood that before a ten's complement or add-one operation can take place, a nine's complement operation must be completed. The nine's complement shift is accomplished through the energization of the relay R-4 which shifts the lines coming from the register sensing head from a group of contacts connected to the solenoids representing either the number or the number plus one as determined by relay R-5 to another group of contacts which are connected to the numeral solenoids representing the nine's complements. The relay R-4 is energized upon the sensing of a negative total whenever the usual sensing wheel in the totalizer contacts a shift sensing finger in the sensing head 355. When this occurs, current will flow from ground of the left register (Fig. 38), through the negative total sensing finger SH, over wire 542, to and through the shift contacts SH on the third tabulator bank (normally closed), over wire 543, to and through the left shift contact SH (normally closed) on the relay R-3, over wire 544, to and through the shift contacts SH on R-1 (now closed because this relay is energized), over wire 545, to and through the negative contacts R-4 NEG on relay R-4, over wire 546, to the negative end of the coil of relay R-4. The return for the relay R-4 is as follows:

From the positive end of the coil of the relay, over wire 547, to and through the flick switch contacts COM, over wire 548, to and through the "ON" side of the automatic balance switch, over wire 550 and over wire 531, to the positive plate of the rectifier.

During the printing of a negative total, the digits sensed will be printed as nine's complements until the lowest digit other than zero has been sensed. For this digit a circuit is established to the solenoids representing the ten's complement of the numbers sensed. When the relay R-5 is employed as a ten's complement or add-one relay, the relay R-8 deenergizes and completes a circuit to the relay R-5 through its R-5 add-one contacts to the ten's complement position in the usual manner. However, during this operation the relay R-4 still remains energized and, through the extension 142 of its armature 141, locks the cam trip latch 138 against movement, as above described. This will prevent the releasing of the tabulator cam 140 when the relay R-5 is used for an add-one operation, and the spring 137 will merely be extended without having any effect upon the cam trip latch.

Assuming that the typewriter carriage is being tabulated to an automatic printing column the rectifier is supplied with current as soon as the tabulator key is depressed which also causes relay R-1 to energize. Should the carriage have been shifted manually and not restored to normal prior to tabulator operation the relay R-1 make contact on relay R-4 operated by the shift cam pull wire would be closed. This establishes an additional circuit to relay R-1 in the following manner:

From ground over wires 522, 523 to and through the R-1 make contact on relay R-4 over wire 601 to and through the R-1 break contact on the same relay over wire 602 to and through the R-1 disconnect contact on relay R-2 and over wires 603 and 537 to the coil of relay R-1 and return to the positive of the rectifier as described above.

Consequently relay R-1 remains energized as long as the carriage is in shift position since the tabulating operation causes the rectifier to be supplied with current through the AC contact on the tabulator frame on the relay R-8 as has been described above. The slow release characteristics of relay R-1 make it possible for the operator to restore the carriage to normal before printing the automatic date or automatic balance.

Assuming that the typewriter carriage is being tabulated to an automatic balance column having a negative or credit balance registered it is necessary to prevent the machine from operating if the typewriter carriage has previously been shifted manually. This is due to various set up combinations which will now be described.

Assuming that a credit balance is being posted in which the carriage has to be shifted manually by means of the credit balance key and this posting takes place in the preceding column from which an automatic balance is to be delivered, and if the machine is provided with automatic tabulation to bring the typewriter carriage automatically into the balance column, it would be impossible for the operator to restore the carriage to normal should a positive balance exist in the cross register.

Further, should a negative balance exist in the cross foot register the operator having shifted the carriage by means of the shift key, the actuator reversing clutch would be disconnected and consequently automatic sensing of the credit balance would only cause the circuit change through the relay R-4, but no reversal of the actuator could take place. It can easily be seen that any of the above described situations would result in misoperation of the machine.

To prevent such misoperation the relay R-4 is provided with an additional R-4 break contact operated by the shift pull wire 144. The purpose of this contact is to break the R-4 circuit originating at the shift contact on relay R-1. This additional R-4 contact is adjusted in such a way that the R-4 lock contact makes before the R-4 break contact opens and that relay energizes. Were it not for this additional contact the complementary relay R-4 would energize and lock even though the carriage were manually shifted. Having the carriage shifted with the balance key in some cases would not result in a misoperation, but after the automatic printing has occurred the operator could make a positive posting in the following column with the carriage in a shifted position. Therefore, it is vitally important that no matter what account of an automatic balance is to be delivered the machine will only commence to deliver a balance after the typewriter carriage has been restored to normal so that the automatic sensing of a positive balance will proceed in the usual manner and the automatic sensing of a credit balance will therefore shift the carriage and release the carriage entirely automatically.

It will now be seen that if the carriage is shifted manually the pull wire (acting as a push bar) will also open the break contact R-4 so that the negative impulse to relay R-4 is interrupted. Were it not for this contact R-4 would be energized and make the R-1 circuit negative. This would result in the machine proceeding as usual.

As the carriage is released however, that is until either restored for the credit balance key or carriage shift, the pull wire will also restore and close the break contact R-4 for which the negative impulse from the shift contact on relay R-1 will continue to flow through the relay R-4 directly to the coil of relay R-4.

Since the lock contact R-4 is adjusted to make before the break contact R-4 opens the circuit the negative impulse will originate at ground and supply the coil of R-4 with current as long as the rectifier is supplied with current or the return circuit of relay R-4 remains otherwise closed.

This circuit is from ground over the left register and the shift sensing finger SH, wire 542 to and through the left shift break contacts SH on the third bank of the tabulator frame contacts, over wire 543 to and through the left shift contact SH on R-3 over wire 544 to and through the shift contacts SH on relay R-1, over wire 545 to and through the R-4 negative contact on relay R-4, over wire 546 to the negative coil of that relay. The return circuit is as described above.

*Automatic symbol printing*

It will be recalled that the sensing disc 333 (Fig. 27) is adapted to be rotated according to the condition of the cross totalizer, i. e., clear or not clear. When the totalizer is in a clear state, i. e., when all the dial wheels are in their zero position, the sensing finger 335 on the disc is in a position to be sensed by a contact in the usual sensing head 355 (Fig. 2). This will establish a circuit to the clear symbol solenoid, which will effect the printing of a clear symbol automatically without the intervention of an operator. The circuit for the automatic symbol printing device will be described in connection with the left hand cross totalizer, but it will be understood that it is equally adapted to serve additional cross totalizers. When the above circuit is established, current will flow as follows:

From ground (Fig. 38), through the symbol sensing disc 333, to and through the symbol contacts (*), over wire 551, to and through the left symbol contacts SYM on the first bank of the Tabulator Frame over wire 552 to and through the left symbol contacts SYM on relay R-3, over wire 553, to and through the R-6 SYM contacts (now closed) on R-9, over wire 554, to the negative side of the coil of relay R-6. The return for the relay R-6 is from the positive end of its coil, over wire 555, over wire 547, to and through the flick switch contacts COM, over wire 548, to and through the "ON" side of the automatic balance switch, over wire 550 and over wire 531, to the positive terminal of the rectifier. When the relay R-6 is thus energized, its holding contacts R-6 locks are closed, thereby establishing a holding circuit for the relay R-6 as follows:

From the negative terminal of the rectifier 520, over wires 522, 523 and 556, to and through the R-6 Lock contacts of relay R-6, and over wires 557 and 554, to the negative end of the coil of relay R-6. The return for the relay R-6 is as above described.

When relay R-6 is energized, a symbol solenoid for printing an asterisk is energized as follows:

From the negative terminal of the rectifier, over wire 522, over wire 523, over wire 556, to and through the symbol contacts SYM on the relay R-6, over wire 558, to the center contact of the asterisk Star contact AST-STAR on the relay R-3, and through the left contact AST, over wire 559, to the negative side of the asterisk solenoid AST. The return for this solenoid is from the positive side of the solenoid, over wire 560, to and through the common contacts COM on relay R-9 (now energized), over wire 561, to and through the common contacts COM of the full stroke mechanism, over wire 562, to and through the escapement common contact COM, over wire 563, to and through the common contact COM on the relay R-1, over wire 564, over wire 547, to and through the common contact COM of the flick switch, over wire 548, to and through the "ON" side of the automatic balance switch, over wire 550 and over wire 531, to the positive plate of the rectifier.

Figure 39:
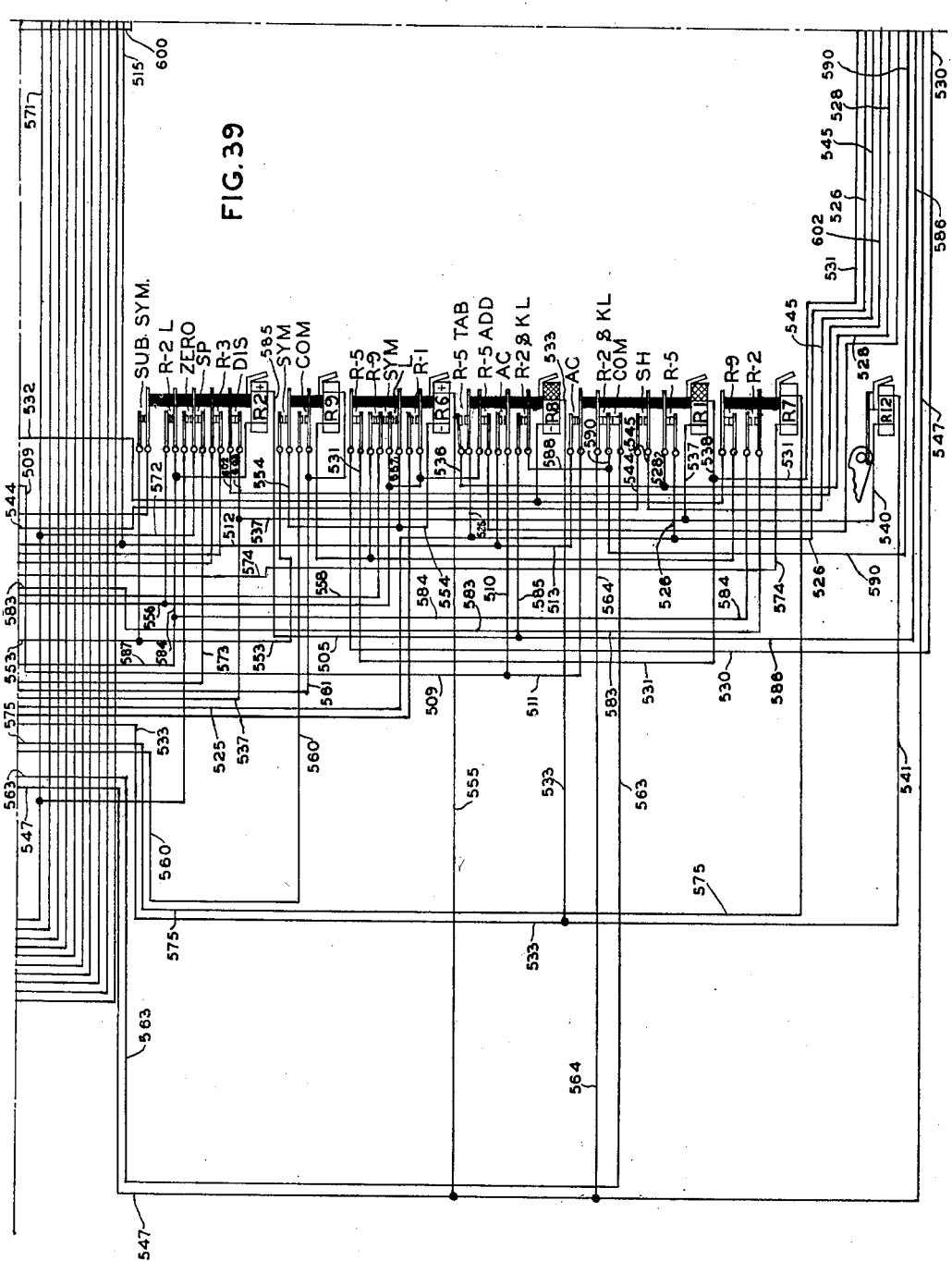

The symbol contacts on relay R-3 are for the purpose of selecting a negative impulse from the correct cross totalizer in order to energize the symbol relay R-6. The left hand symbol contact on relay R-3 selects the negative impulse from the left hand cross totalizer, as indicated in Fig. 38, and the right hand symbol contact selects the negative impulse from the right hand totalizer whenever relay R-3 is energized. It will be noted, therefore, that the left hand contact is normally closed, but upon the energization of relay R-3, which only energizes upon sensing of a total from the right hand cross totalizer, the contacts will be shifted whereby the impulse is taken from the right hand cross totalizer through the right hand contacts to establish a circuit to the relay R-6. It will be further noted that normally the left hand symbol contacts are the second contacts from the left of relay R-3 (Fig. 38) and are normally closed when receiving an impulse from the left hand cross totalizer, whereby a circuit may be established to the asterisk solenoid AST (Fig. 39). When, however, the relay R-3 is energized, the symbol contacts are shifted, whereby the symbol circuit may be established through the right hand contacts for the symbol solenoid STAR (Fig. 39). The negative circuit for the symbol solenoid STAR may thus be established as follows:

From the negative plate 520 of rectifier 503, over wire 522, wire 523, over wire 556, to and through the symbol contacts SYM on relay R-6, over wire 558, to and through the right hand asterisk-star contacts in relay R-3, over wire 565, to the negative side of the solenoid STAR. The return for the solenoid STAR is from the positive side of the solenoid, over wire 566, and thence over wire 560, to the positive plate of the rectifier, as above described for the return circuit for the Asterisk Solenoids.

The cams for controlling the energization of the symbol solenoids AST and STAR are shown in Figs. 28, 29, 30 and 31. It will be noted that each of the above cams 280 has a cam surface "A" for actuating its corresponding slide 277 to thereby close the AC contacts on the third bank of control contacts (Fig. 37). The closing of the AC contact will supply current to the rectifier, whereby direct current may be supplied to the solenoids. The right symbol control cam shown in Fig. 29 is provided with an upper control cam 278 having a "D" surface for closing the control contacts for relay R-3 for the right register (Fig. 37). The "D" surfaces on the cams 278 of Figs. 29 and 31 serve to close the relay R-3 contact on the third bank of control contacts.

The R-6 symbol contact SYM on relay R-9 is necessary in the relay R-6 circuit due to the fact that when the carriage spaces from the unit-cent position to the symbol position, the sensing finger is picked up by the symbol sensing gear disc before the escapement common contacts COM close. Inasmuch as the return circuit for relay R-9 is not completed until the escapement common contact is closed, relay R-6 cannot be energized until relay R-9 energizes and closes its R-6 contact. The relay R-9 also completes the return circuit for the asterisk and STAR solenoids. Therefore, when relay R-6 is energized and closes its symbol contact, the symbol circuit is completely established.

*Automatic balance disconnect*

In order to enable the writing of words through automatic balance and date columns, the automatic balance and date circuits, must be disabled to eliminate the printing of an automatic balance or date when it is desired to write through these columns.

Referring to Fig. 37, the AC contact on the fourth bank of control contacts is provided to retain an A. C. circuit once it has been established as long as this contact is held closed by the control surfaces "A" or "B" on either of the automatic balance cams shown in Figs. 30 and 31. However, if this contact AC is closed before establishing an A. C. circuit by means of the operation of the flick switch 131, no current will flow to the rectifier over any automatic balance or date column. Therefore, it will be possible to write over any of these columns without initiating automatic operation of these mechanisms. This may be seen in the circuit wherein, if the AC contact on the fourth bank of control contacts is closed, the automatic balance circuit will not be established as long as the AC contact of the flick switch 131 remains open. This circuit can be traced from the AC contact on the fourt bank of the control contacts, over wire 506, and over wire 504, to the AC contacts of the flick switch 131.

A parallel circuit to this has been described in connection with the AC circuit. It goes from the other side of the AC contact in the fourth bank of the tabulator frame over wire 507 to the long contact arm on each of the tabulator frame over wire 507 to the long contact arm on each of the AC contacts on R-1, R-8 and R-4 and to a contact on the cross truck AC contact. The short sides of the AC contacts of R-1, R-4 and R-8 are also connected together and to the opposite outside arm of the cross truck AC contacts so that if any of these AC contacts and either the flick switch or the AC tabulator frame contacts are closed the AC circuit to the rectifier will be completed.

*High speed space mechanism*

As set forth above, the relay R-7 which operates directly on the escapement rocker mechanism is for the purpose of spacing the carriage at high speed over insignificant digits appearing before an actual total can be printed from a cross totalizer. The relay R-7 is energized as follows:

Taking the left cross totalizer (Fig. 38) for example, when the cross totalizer is moved into a total sensing position and a positive total exists, the zero sensing finger on the totalizer disc will contact a zero sensing finger in the sensing head 329 (see Fig. 2). The totalizer being grounded, current will flow through the zero contact in the sensing head, over wire 567, to and through the left zero contacts on relay R-3, over wire 568, to and through the normally closed zero contacts on relay R-5, over wire 570, to and through the normally closed zero contacts on relay R-4, over wire 571, over wire 572, to and through the space contacts SP on relay R-2, over wire 573, to and through the space contact SP on the fifth bank of control contacts and over wire 574, to the negative side of the relay R-7. The return circuit for the relay R-7 is as follows:

From the positive side of relay R-7, over wire 575, to and through the common contacts of the fifth bank of control contacts, over wires 576 and 560, to and through the common contact COM on relay R-9 (now energized), over wire 561, to and through the common contact of the full stroke mechanism, over wire 562, over to and through the common escapement contacts COM, over wire 563, to and through the R-2, KL and the common contact COM on relay R-1, over wires 564 and 547, to and through the common contact COM of the flick switch 131, over wire 548, to and through the "ON" side of the automatic balance switch and over wires 550, and 531, to the positive terminal of the rectifier.

When a comma or decimal space position is reached on the left cross totalizer, spacing is accomplished as follows:

Referring to Fig. 38, current flows from Ground of the left totalizer, through the space sensing disc SP in the sensing head, over wire 577, to and through the space contacts SP on the relay R-3 and over wires 578 and 574, to the negative side of the relay R-7. The return for the relay R-7 is as above described. When a comma or decimal position is reached in the right totalizer, current will flow from ground, through the space sensing disc, through the space sensing finger in the sensing head, over wire 580, to and through the right hand space contacts SP (now closed) of the relay R-3 and thence over wires 578 and 574 to the negative side of the relay R-7, as above described.

Escapement switch

The escapement common contacts COM (Fig. 37) are provided in order to break the return circuits for the relays R-7 and R-9, and for all printing relays each time that a spacing operation takes place. This escapement contact is placed in the circuit between the above mentioned relays and the positive terminal of the rectifier so that whenever spacing occurs the circuit to these relays is broken to thereby prevent their operation. Referring to Fig. 41, the return circuit for the numeral printing magnets leads from the numeral solenoids, over wires 581 and 575, to and through the COM contact on the fifth bank of contacts on the tabulating frame, over wires 576 and 560, to and through the common contact of R-9, over wire 561, to and through the COM contact on the full stroke pawl, over wire 562, to and through the escapement switch COM, over wire 563, to and through the COM and R-2, KL contacts on R-1, over wires 564 and 547, to and through the COM contact on the flick switch 131, over wire 548, to and through the automatic tabulator switch and over wires 550 and 531 to the positive terminal of the rectifier, whereby the circuit is broken whenever the escapement switch is open.

Asterisk prefix (special)

In automatic balance and sub-balance position the asterisk is prefixed before amounts in certain designated positions and omitted in other balance and sub-balance positions, where they are not required.

The number of asterisks prefixed will be the difference between the digit capacity of the cross register and the amount in the cross register. For instance, if a 7 place cross register is used and the amount of $50.00 is to be printed, three asterisks will be prefixed. This is based on the assumption that the stop is set for the highest digit position of the register. To save space the tabulator stops may be set in the proper position to print any desired number of asterisks. For example, if an eight place register is used and the amount on the checks to be written is four figures, in order to prefix two asterisks, the tabulator stop would be set in the sixth digit position of the register.

This feature is actuated by a special automatic operation cam located on the automatic cam support bar and no special "cut-off" switch is provided. This is made possible by the use of a Special Asterisk Prefix Break-make Contact located on the fifth bank of the Tabulator Frame. This contact is operated by the "C" surface of a total or sub-total cam positioned over the columns where prefixing is desired. In columns where a "B" surface cam is used, the carriage will space instead of prefixing.

Since the Single Cross Registers are grounded, prefixing takes place from the zero (0) sensing finger from the left cross register as follows:

When the Cross Register is picked up and zeros precede a numeral to the left of the decimal position, the zero sensing Disc contacts the zero Sensing Finger and current will flow from Ground through the Zero Sensing Disc through the sensing finger and over the wire 567, to and through the zero contact on relay R-3, and continue over the wire 568, to and through the zero contact on relay R-5, over the wire 570, to and through the zero contact on relay R-4 (since R-4 is de-energized) over the wires 571 and 572, to and through space contact on relay R-2 and, since relay R-2 is not energized, current will flow over wire 573 to the center leaf of the Space Asterisk Contacts located on the fifth bank of the tabulator frame. When a machine is operating in total position with the "B" surface cam, current will flow out the front leaf of the space-asterisk contact on the fifth bank of the tabulator frame over wire 574, to the negative side of the relay R-7 coil.

However, if the carriage is tabulated to a total position in which a cam with a "C" surface is used, the space circuit would be broken and the asterisk circuit completed through the rear leaf of the asterisk space contact on the fifth bank Tabulator Frame, over wires 585 and 559 to the negative side of the asterisk solenoid, thus prefixing the amount with Asterisks.

Space-zero relay

In connection with the description of the operation of the spacing relay R-7 it was stated that its return circuit was through the space contacts of the relay R-2. The purpose of this relay is to change the impulse from the space relay to the zero solenoid after any numeral from 1 to 9 inclusive, is printed to the left of a decimal point and to print cyphers if the register is clear to the right of the decimal point.

If a numeral prints before the decimal point is reached and R-2 make contact, operated by the lower Full Stroke Pawl of the actuator, is closed so that current can flow from the negative terminal of the rectifier over wires 522, 523 and 582, to and through the R-2 contact on the fourth bank of the tabulator frame over wire 583 and to and through the R-2 contacts on R-7 over wire 584 to the negative side of the coil of R-2.

The return circuit of this relay is completed from the positive side of R-2 over wire 585 to the short leaf of the R-2 and KL contact on R-8 and continues over wire 586 to the normally closed leaf of the R-2 and KL contact on relay R-5 and also over wire 587 to the short leaf of the R-2 and KL contact on relay R-4. Relay R-8 is always energized when positive totals print. Therefore, the R-2 and KL contact on relay R-8 is closed, and current will flow through it and over wires 588 and 590 to the long leaf of the R-2 and KL contact on relay R-4 and also over wire 591 to the center leaf of the R-2 and KL contact on relay R-1. This contact is always closed when automatic printing takes place, and current will flow through it over wires 564 and 547 to and through the Flick Switch COM Contact since this contact is always closed when printing takes place, and over wire 548 to the "ON" side of the switch through it and over wires 550 and 531 to the positive side of the rectifier. This energizes relay 2 and its Lock Contact keeps it energized until the AC Circuit on the return circuit is broken.

When a credit balance is to be printed the relay R-4 is energized and closes the R-2 and KL make contact on relay R-4. This contact is wired parallel to the R-2 and KL make contact on relay R-8. When the ten's complement position is reached, relay R-8 deenergizes and opens its R-2 and KL contact. If it were not for the R-2 and KL make contact on relay R-4, relay R-2 would be de-energized, and the carriage would space when zeros should print.

To energize relay R-2 at Decimal Space Position, both right and left Register Total Cams have a "C" surface at the Decimal space position only. Relay R-2 is energized at the decimal space position so that zeros can print to the right of a decimal position when a numeral has not been printed to the left.

When relay R-7 is spacing the carriage in an automatic Total or Sub-Total Register, the R-2 make contact on relay R-7 will be closed on each operation. The closing of this contact will only complete the circuit to relay R-2 at the Decimal space position since this is the only point at which the R-2 make contact on the fourth bank of the tabulator frame is closed on the "C" surface of the Total Cam. Therefore, current will flow from ground 521 over wires 522, 523 and 582 to and through the R-2 make contact on the Tabulator Frame, over wires 583 to and through the R-2 make contacts on relay R-7 (since this contact is closed) and over wire 584 to the negative side of the coil of relay R-2. The return circuit is as previously described.

The R-2 lock contact will keep the relay R-2 energized until the AC circuit is broken and tabulation takes place or the switch is turned off.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth and as hereinafter claimed.

Having thus described our invention, we claim:

1. In a machine of the class described, having a movable carriage, a switch, a tens-complement relay, a nines-complement relay, and a tabulating cam mechanism, the combination of means operated by the movement of the carriage to close the switch at a predetermined point in said movement, circuit devices for energizing the tens-complement relay when the switch is closed, means operated by the tens-complement relay when energized to release the tabulating cam mechanism, means operated by the nines-complement relay when energized to prevent the release of the tabulating cam mechanism by the tens-complement relay, and means operated by the cam mechanism when released to engage and hold the switch closed until the cam mechanism is restored to normal condition.

2. In a machine of the class described, a movable carriage, combined decimal and columnar tabulating keys, a tabulating head having slides disposed at successive levels each bearing a horizontally graduated stop, a tabulating unit adapted upon operation to eject one of said slides, a tabulating cam adapted when released to operate said unit, a second cam in conjunction with said tabulating cam, means adapted upon the depression of any of said keys to release said tabulating cam, means operable upon release of said tabulating cam for exerting rotational pressure on said second cam, and means movable with the carriage adapted to be arrested by said ejected slide for selecting a decimal or columnar position of the carriage.

3. In a machine of the class described, a movable carriage, a total sensing mechanism, a tabulating mechanism adapted upon operation to release the carriage for movement as well as to arrest it in a predetermined total sensing position, a first electro-magnet adapted when energized to initiate an operation of said tabulator mechanism or perform a total sensing function, a flick switch in circuit with said electro-magnet, tabulating keys adapted to actuate said flick switch, a second electro-magnet adapted when energized to prevent the initiation of operation of said tabulator mechanism by said first electro-magnet and permit the total sensing function thereof, means movable with the carriage adapted to be arrested in said predetermined position and means adapted upon operation of the total sensing mechanism to energize said second electro-magnet.

4. In a machine of the class described, a movable carriage, columnar tabulating keys, a tabulating head having slides disposed at successive levels each bearing a horizontally graduated stop representing a columnar position of the carriage, a tabulating unit adapted upon operation to eject one of said slides, means operable upon the depression of any of said keys for releasing the carriage for movement as well as to initiate operation of said tabulating unit; and column stops movable with the carriage and having abutments disposed at graduated levels each of which is adapted to be arrested by one of said graduated stops and is associated with one of said keys.

5. In a machine of the class described, a movable carriage, columnar tabulating keys, a tabulating head having slides disposed at successive levels each bearing a horizontally graduated stop representing a columnar position of the carriage, a tabulating unit adapted upon operation to eject one of said slides, an electro-magnet adapted upon energization to initiate operation of said tabulating unit, means operable upon the depression of any of said keys for releasing the carriage for movement as well as to energize said electro-magnet, and column stops movable with the carriage and having abutments disposed at graduated levels each of which is adapted to be arrested by a corresponding slide stop.

6. In a machine of the class described, a movable carriage, decimal tabulating keys, a tabulating mechanism operable upon depression of any of said keys for releasing the carriage for movement as well as to arrest it in a predetermined decimal position adapted to be set in accordance with any of said keys, an electro-magnet adapted upon energization to initiate operation of said tabulating mechanism, means adapted upon the flicking of any of said keys to close a circuit to said electro-magnet, means associated with said tabulating mechanism when operated for holding said circuit closed, and means movable with the carriage adapted to be arrested in said predetermined decimal position and to break the circuit to said electro-magnet.

7. In a machine of the class described, a movable carriage, an electrically controlled tabulating mechanism, a tabulating key, an electrically controlled automatic balance printing device, a source of electric current for said device, a normally open switch controlling said source of electric current, a cam movable with the carriage and adapted to close said switch at a certain point in the travel of the carriage, a second switch connected in series with the first mentioned switch having a set of normally open contacts, an electro-magnet controlling said second mentioned switch, a flick switch under control of the tabulator key having two sets of normally open contacts one connected across the first and second mentioned switch contacts and a second set of contacts in circuit with the magnet controlling the second mentioned switch and paralleled by a second set of contacts on the second mentioned switch so that when the flick switch has been once closed a parallel circuit is set up across the first mentioned contacts of the second and third switches when the carriage arrives in the predetermined automatic balance printing position and closes the contacts of the first mentioned switch.

8. In a machine of the class described, a movable carriage, an electrically controlled tabulating mechanism, a tabulating key, an electrically controlled automatic balance printing device, a source of electrical energy for said device, a cross totalizer, means for carrying the cross totalizer, a normally open switch controlling said source of electrical energy, cam movable with the carriage and adapted to close said switch at a certain point in the travel of the carriage, a second switch connected in series with the first mentioned switch having two sets of contacts adapted to make one set of contacts before breaking the other under control of the said cross totalizer carrying means at a certain point in its motion, a switch under control of the tabulator connected across the first and second mentioned switches and adapted upon the operation of the tabulator key, to momentarily close a circuit to commence the operation of the machine and then to break that circuit so that the other first two mentioned switches close an alternative circuit at a later time.

9. In a machine of the class described, a movable carriage, an electrically controlled tabulating mechanism, a tabulating key, an electrically controlled automatic balance printing device, a source of electric current for said device, a normally open switch controlling said source of current, a cam movable with the carriage and adapted to close said switch at a certain point in the travel of the carriage, a plurality of magnetically controlled switches each having a normally open contact, such contacts connected in parallel with each other and in series with a normally open pair of contacts of the first mentioned switch, a flick switch under control of the tabulator key having at least two sets of normally open contacts one connected across the first, second and third mentioned switch contacts and a second set of contacts in circuit with the magnet controlling the said magnetically controlled switches being provided with holding contacts so that when the flick switch has been once closed a parallel circuit is set up across the said normally open contacts of at least one of the magnetically controlled switches and maintained after the flick switch is released so that when the carriage arrives at the predetermined automatic balance printing position and closes the contacts of the first mentioned switch a circuit will be completed to supply electric current to the automatic printing device and only then.

10. In a machine of the class described, a movable carriage, an electrically controlled tabulating mechanism, a tabulating key, an electrically controlled automatic balance printing device, a cross totalizer, means for carrying the cross totalizer, a source of electric current for said device, a normally open switch controlling said source of current and an automatic balance cam movable with the carriage and adapted to close said switch at a certain point in the travel of the carriage, a second switch connected in series with the first mentioned switch having two sets of contacts adapted to close one set of contacts before breaking the first under control of the said cross totalizer carrying means at a certain point in its motion, a third switch having a set of normally open magnetically controlled contacts connected in parallel with the cross totalizer switch contacts and the two sets of contacts connected in series with the first mentioned carriage controlled contacts, a fourth switch having at least two pair of normally opened contacts one of which is connected across the above mentioned combination of contacts, and the other in circuit with the controlling magnet of the third mentioned magnetically controlled switch which is also provided with a set of holding contacts so that when the fourth switch is operated a circuit will be closed to actuate the third mentioned magnetically controlled switch and so provide a parallel circuit when the fourth switch is released but only if it has first been operated and if the carriage is in a predetermined position.

11. In a machine of the class described, a movable carriage having banked vertical registers thereon, a cross truck having a cross register thereon adapted to be picked up and released by the vertical registers, a tabulating mechanism for tabulating the carriage, an electro-magnet for initiating operation of said tabulating mechanism, means whereby the vertical registers are adapted to pick up the cross register and move it into an active position when the carriage is tabulated, a device for locking the cross register in an inactive position upon its release by a vertical register, an electro-magnet adapted to operate said locking device, and means operable upon the energization of said tabulating magnet for energizing said locking device electro-magnet.

12. In a machine of the class described, a movable carriage, a date printing mechanism, a carriage shift mechanism, a member operating the carriage shift mechanism, a magnetically controlled switch having a pair of contacts one normally closed and one normally open, the normally open contact adapted to be closed by the carriage shift operating member, a third set of normally closed contacts controlled by the same magnet as the above mentioned switch connected in series with the normally open carriage shift operating member controlled contact, a second electro-magnetically controlled switch with its controlling magnet in series with the above mentioned series contacts, normally closed contacts on the second electro-magnetically controlled switch, a total sensing and printing mechanism supplied with current through the normally closed contacts on the second mentioned electro-magnetically controlled switch so that when the carriage shift mechanism is operated neither the date printing mechanism nor the total sensing and printing mechanism can operate.

13. In a machine of the class described, a movable carriage, a carriage shift mechanism, a member operating this mechanism, a magnetically controlled switch having a pair of normally closed contacts, and a normally open contact, one of the normally closed contacts adapted to be opened by the movement of the carriage shift mechanism operating member in one direction, the normally open contact connected in series with the operating electro-magnet controlling this switch and adjusted to close before the associated normally closed contact opens when the controlling electro-magnet is energized, a second electro-magnetically controlled switch having a set of normally closed contacts in series with the electro-magnet controlling the first mentioned switch, a total sensing and printing mechanism supplied with current through the normally closed contacts on the second mentioned electro-magnetically controlled switch so that when the carriage shift mechanism is operated the total sensing and printing mechanism cannot operate until the carriage is returned to normal position.

14. In a machine of the class described, having a movable carriage, a switch, a first electromagnet means, a second electromagnet means, a total sensing mechanism, a tabulating mechanism adapted upon operation to release the carriage for movement as well as to arrest it in a predetermined total sensing position including a tabulating cam mechanism, the combination of means operated by the movement of the carriage to close the switch at a predetermined point in said movement, circuit devices for energizing the first electromagnet means when the switch is closed, means operated by said first electromagnet means when energized to release the tabulating cam mechanism, means operated by the second electromagnet means when energized to prevent release of the tabulating cam mechanism by the first electromagnet means, means operated by the cam mechanism when released to engage and hold the switch closed until the cam mechanism is restored to normal condition, first electromagnet means being adapted when energized to initiate an operation of said tabulator mechanism to perform a total sensing function, a flick switch in circuit with said first electromagnet means, tabulating keys adapted to actuate said flick switch, said second electromagnet means being adapted when energized to prevent the initiation of operation of said tabulator mechanism by said first electromagnet means and permit the total sensing function thereof, means movable with the carriage adapted to be arrested in said predetermined position and means adapted upon operation of the total sensing mechanism to energize said first electromagnet means.

EDWIN OTTO ROGGENSTEIN.
EMIL F. THIERFELDER.

REFERENCES CITED

The following references are of record in the file of this patent:

UNITED STATES PATENTS

| Number | Name | Date |
| --- | --- | --- |
| 1,273,545 | Seib | July 23, 1918 |
| 1,285,150 | Hart | Nov. 19, 1918 |
| 1,517,424 | Hart | Dec. 2, 1924 |
| 1,566,286 | Smith | Dec. 22, 1925 |
| 1,985,826 | Hart | Dec. 25, 1934 |
| 2,064,154 | Dodge et al. | Dec. 15, 1936 |
| 2,224,771 | Mills | Dec. 10, 1940 |
| 2,236,642 | Kammel | Apr. 1, 1941 |
| 2,278,118 | Pitman | Mar. 31, 1942 |
| 2,364,758 | Roggenstein | Dec. 12, 1944 |
| 2,364,759 | Roggenstein | Dec. 12, 1944 |
| 2,412,537 | Roggenstein | Dec. 10, 1946 |